United States Patent
Fukuda et al.

(10) Patent No.: US 12,139,888 B2
(45) Date of Patent: Nov. 12, 2024

(54) WORKING MACHINE

(71) Applicant: KUBOTA CORPORATION, Osaka (JP)

(72) Inventors: Yuji Fukuda, Osaka (JP); Kohei Nagao, Osaka (JP); Ryota Hamamoto, Osaka (JP); Tomoyuki Noguchi, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 519 days.

(21) Appl. No.: 17/358,941

(22) Filed: Jun. 25, 2021

(65) Prior Publication Data

US 2022/0049472 A1 Feb. 17, 2022

(30) Foreign Application Priority Data

Aug. 15, 2020 (JP) .................................. 2020-137181
May 25, 2021 (JP) .................................. 2021-087696

(51) Int. Cl.
*E02F 9/22* (2006.01)
*E02F 9/24* (2006.01)
(Continued)

(52) U.S. Cl.
CPC ............ *E02F 9/261* (2013.01); *E02F 9/2253* (2013.01); *E02F 9/24* (2013.01); *B60R 11/04* (2013.01);
(Continued)

(58) Field of Classification Search
CPC ........... E02F 9/261; E02F 9/2253; E02F 9/24; B60R 11/04; B60R 2300/70; B60R 2300/8093
See application file for complete search history.

(56) References Cited

U.S. PATENT DOCUMENTS

2001/0026317 A1    10/2001   Kakinami et al.
2009/0174536 A1*   7/2009    Rao ........................... B60T 7/22
                                                              340/436
(Continued)

FOREIGN PATENT DOCUMENTS

JP           5-112975         5/1993
JP           11-339194        12/1999
(Continued)

OTHER PUBLICATIONS

Office Action issued in Corresponding JP Patent Application No. 2021-087696, dated Feb. 20, 2024, along with an English translation thereof.

(Continued)

*Primary Examiner* — Peter D Nolan
*Assistant Examiner* — Roy Rhee
(74) *Attorney, Agent, or Firm* — Greenblum & Bernstein, P.L.C.

(57) ABSTRACT

A working machine includes a machine body, a traveling device provided on the machine body, an operation member operable to activate the traveling device, a camera device to capture an image of surroundings of the machine body, a display unit to display the image captured by the camera device, a notification unit to notify a traveling direction of the traveling device, and a controller to control the display unit and the notification unit so that when the operation member is operated to activate the traveling device, the display unit is controlled to display the captured image and the notification unit is controlled to notify the traveling direction. The controller delays either one of a first timing when the display unit starts to display the captured image and a second timing when the notification unit starts to notify the traveling direction later than the other.

18 Claims, 11 Drawing Sheets

(51) Int. Cl.
    *E02F 9/26*     (2006.01)
    *B60R 11/04*     (2006.01)

(52) U.S. Cl.
    CPC ... *B60R 2300/70* (2013.01); *B60R 2300/8093* (2013.01)

(56) References Cited

U.S. PATENT DOCUMENTS

| | | | |
|---|---|---|---|
| 2012/0073894 A1* | 3/2012 | Sprinkle | B60D 1/36 180/336 |
| 2013/0187353 A1* | 7/2013 | Mock | B60T 13/662 280/80.1 |
| 2020/0332479 A1* | 10/2020 | O'Donnell | E01C 23/07 |

FOREIGN PATENT DOCUMENTS

| | | |
|---|---|---|
| JP | 2001-315600 | 11/2001 |
| JP | 2006-219894 | 8/2006 |
| JP | 2010-121270 | 6/2010 |
| JP | 2014-91973 | 5/2014 |
| JP | 2017-178272 A | 10/2017 |
| JP | 2018-155079 | 10/2018 |

OTHER PUBLICATIONS

Office Action issued in Corresponding JP Patent Application No. 2021-087696, dated Aug. 20, 2024, along with an English translation thereof.

\* cited by examiner

WORKING MACHINE

CROSS-REFERENCE TO RELATED APPLICATIONS

This application claims the benefit of priority to Japanese Patent Application No. 2020-137181 filed on Aug. 15, 2020 and to Japanese Patent Application No. 2021-087696 filed on May 25, 2021. The entire contents of this application are hereby incorporated herein by reference.

BACKGROUND OF THE INVENTION

1. Field of the Invention

The present invention relates to a working machine such as a skid steer loader and a compact track loader.

2. Description of the Related Art

Japanese unexamined patent application publication No. 2017-178272 discloses a technique for notifying that a working machine such as a skid steer loader or a compact track loader travels backward.

A working machine disclosed in Japanese Unexamined Patent Application Publication No. 2017-178272 includes a traveling device, a forward traveling operation valve to supply an operation fluid to operate forward traveling of a traveling device, a backward traveling operation valve to supply an operation fluid to operate backward traveling of the traveling device, a first fluid line connecting the traveling device to the forward traveling operation valve, a second fluid line connecting the traveling device to the backward traveling operation valve, a first measuring device connected to the first fluid line and configured to detect a first pressure that is a pressure of the operation fluid of the forward traveling operation valve, a second measuring device connected to the second fluid line and configured to detect a second pressure that is a pressure of the operation fluid of the backward traveling operation valve, a controller to judge, based on the first pressure and the second pressure, whether the traveling device is operated in a forward-traveling direction or a backward-traveling direction, and a notification unit to notify the backward traveling when the controller determines that the traveling device is operated in the backward-traveling direction.

SUMMARY OF THE INVENTION

In a aspect of the present invention, a working machine includes a machine body, a traveling device provided with the machine body, an operation member operable to activate the traveling device, a camera device to capture an image of surroundings of the machine body, a display unit to display the image captured by the camera device, a notification unit to notify a traveling direction of the traveling device, and a controller to control the display unit and the notification unit so that when the operation member is operated to activate the traveling device, the display unit is controlled to display the captured image and the notification unit is controlled to notify the traveling direction. The controller delays either one of a first timing when the display unit starts to display the captured image and a second timing when the notification unit starts to notify the traveling direction later than the other.

In one embodiment of the present invention, the controller delays the second start timing later than the first start timing.

In one embodiment of the present invention, the controller controls the display unit to start to display the captured image when an operation amount of the operation member becomes a first threshold or more, and the controller controls the notification unit to start to notify the traveling direction when the operation amount of the operation member becomes a second threshold or more.

In one embodiment of the present invention, the first threshold is smaller than the second threshold.

In one embodiment of the present invention, the controller controls the display unit to start to display the captured image after an operation amount of the operation member not less than a first threshold is kept for a first predetermined time or longer, and the controller controls the notification unit to start to notify the traveling direction after an operation amount of the operation member not less than a second threshold is kept for a second predetermined time or longer.

In one embodiment of the present invention, the first predetermined time is shorter than the second predetermined time.

In another aspect of the present invention, a working machine includes a machine body, a traveling device provided with the machine body, an operation member operable to activate the traveling device, a camera device to capture an image of surroundings of the machine body, a display unit to display the image captured by the camera device, a notification unit to notify a traveling direction of the traveling device, and a controller to control the display unit and the notification unit so that when the operation member is operated to activate the traveling device, the display unit is controlled to display the captured image and the notification unit is controlled to notify the traveling direction, and so that when the operation member having been operated to activate the traveling device is returned to an unoperated state, the display unit is controlled to finish displaying the captured image at a first timing and the notification unit is controlled to finish notifying the traveling direction at a second timing. The controller delays either one of the first end timing and the second end timing later than the other.

In one embodiment of the present invention, the controller delays the first end timing later than the second timing.

In one embodiment of the present invention, the controller controls the display unit to finish displaying the captured image when an operation amount of the operation member becomes a third threshold or less, and the controller controls the notification unit to finish notifying the traveling direction when the operation amount of the operation member becomes a fourth threshold or less.

In one embodiment of the present invention, the third threshold is smaller than the fourth threshold.

In one embodiment of the present invention, the controller controls the display unit to finish displaying the captured image after an operation amount of the operation member not more than the third threshold is kept for a third predetermined time or longer, and the controller controls the notification unit to finish notifying the traveling direction after the operation amount of the operation member not more than the fourth threshold is kept for a fourth predetermined time or longer.

In one embodiment of the present invention, the third predetermined time is longer than the fourth predetermined time.

In one embodiment of the present invention, the controller, based on an operational state of the operation member, controls the display unit to display an image of surroundings of the machine body in the traveling direction of the traveling device, the image being captured by the camera device, and controls the notification unit to notify the traveling direction of the traveling device.

In one embodiment of the present invention, when the operation member is moved in a direction corresponding to backward traveling of the machine body, the controller controls the display unit to display an image of surroundings behind the machine body, the image being captured by the camera device, and controls the notification unit to notify the backward traveling of the machine body.

In one embodiment of the present invention, the traveling device is hydraulically driven by receiving an operation fluid supply to travel in either one direction or the other direction. The working machine includes a first operation valve to supply the operation fluid based on an operational state of the operation member to operate the traveling device so as to travel in the one direction, a second operation valve to supply the operation fluid based on the operational state of the operation member to operate the traveling device so as to travel in the other direction, a first fluid line to deliver the operation fluid from the first operation valve to the traveling device, a second fluid line to deliver the operation fluid from the second operation valve to the traveling device, a first detector to detect a first pressure of the operation fluid applied to the first fluid line, and a second detector to detect a second pressure of the operation fluid applied to the second fluid line. Based on at least one of the first pressure and the second pressure, the controller detects the operational state of the operation member and judges the traveling direction of the traveling device.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
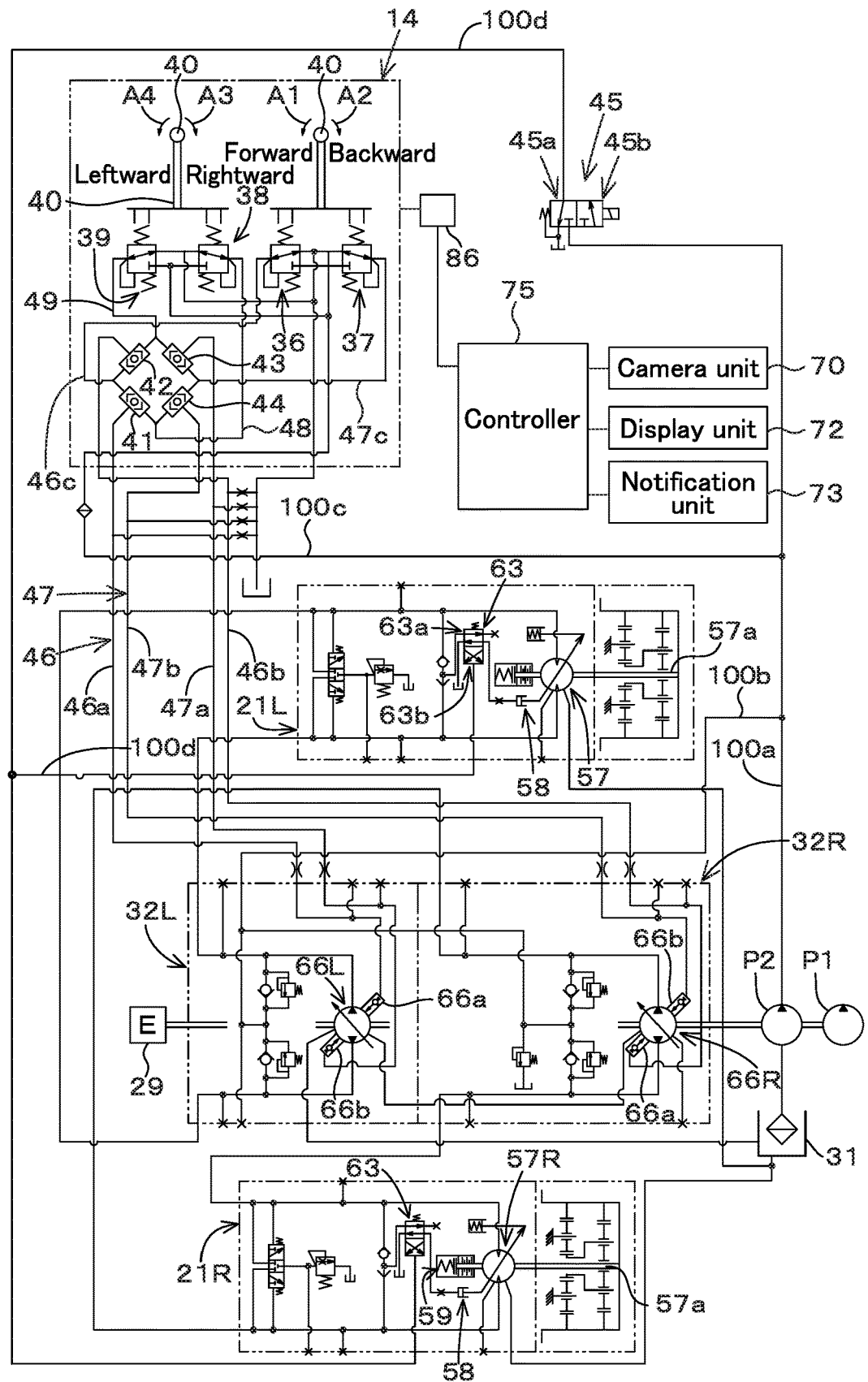
FIG. 1 is a view showing an example of a hydraulic system for a working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

With reference to drawings as appropriate, a preferred embodiment of the present invention will be described below.

An overall configuration of a working machine 1 according to an embodiment of the present invention will be explained.

Figure 11:
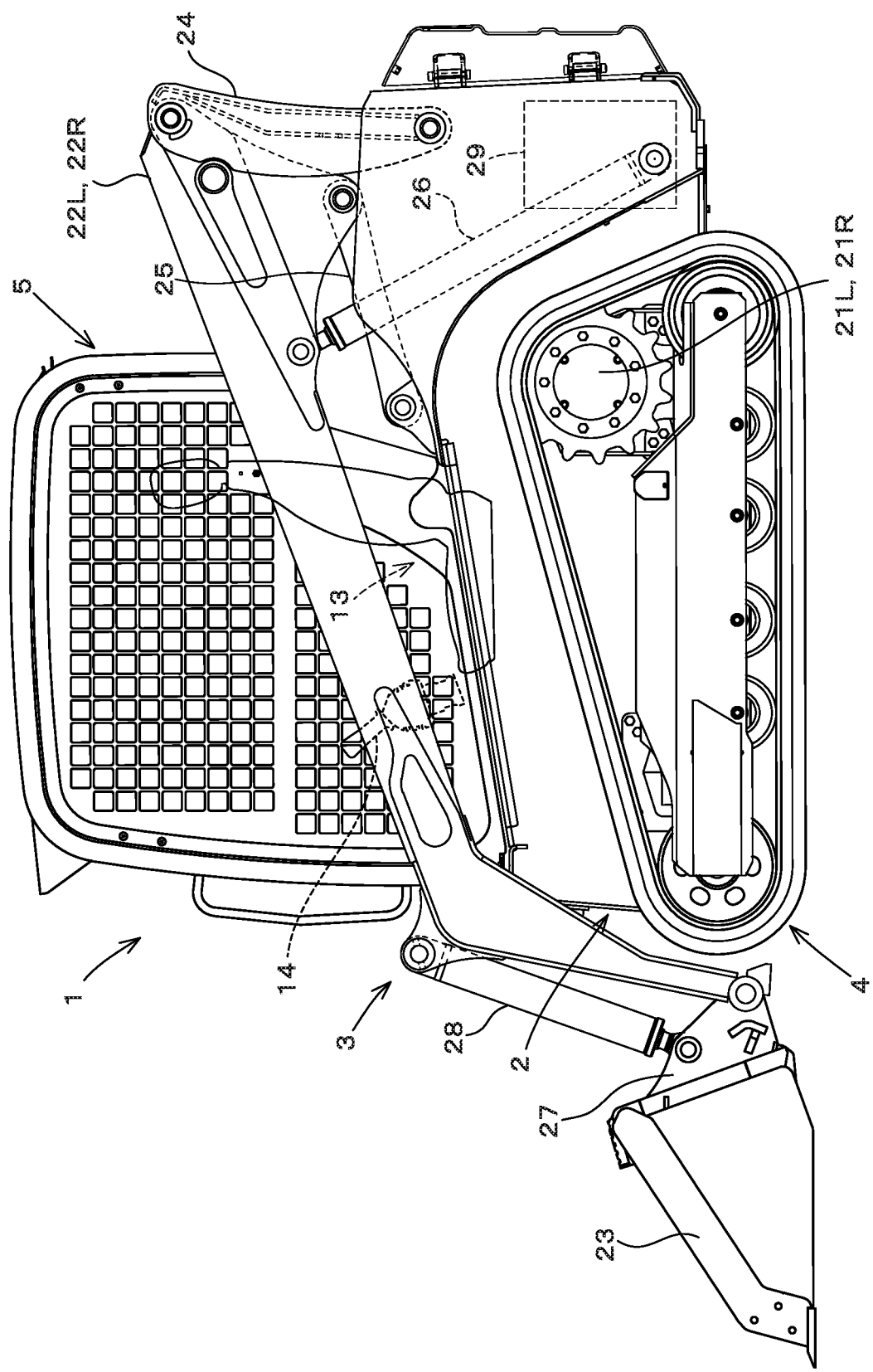
FIG. 11 is a side view showing a track loader that is an example of the working machine.

FIG. 11 is a side view of a track loader that is an example of a working machine 1. The working machine of the present invention is not limited to the track loader, and may be, for example, a tractor, a skid steer loader, a compact track loader, or a backhoe.

As shown in FIG. 11, the working machine 1 has a machine body 2, a working device 3 mounted on the machine body 2, and traveling devices 4 that support the machine body 2 so as to travel. A cabin 5 is mounted on an upper portion of the machine body 2. Inside the cabin 5, a driver seat 13 constituted of a seat having a seating portion and a backrest portion. In the following explanation, a front side of a driver seated in the driver seat 13 (a left side on a front surface of FIG. 11) is referred to as the front of the working machine 1, a rear side of the driver (a right side on the front surface of FIG. 11) is referred to as the rear of the working machine 1, a left side of the driver (a front surface side of FIG. 11) is referred to as the left of the working machine 1, and a right side of the driver (a back surface side of FIG. 11) is referred to as the right of the working machine 1.

A front portion of the cabin 5 is supported by a front portion of the machine body 2. The rear portion of the cabin 5 is supported by the machine body 2 via a support shaft (not shown in the drawings). The support shaft is parallel to a lateral direction of the working machine 1. The cabin 5 is swingable around the support shaft. On one side (for example, the left side) of the driver seat 13 in the cabin 5, a traveling operation device 14 for operating the traveling device 4 is arranged.

The working device 3 has a pair of left and right booms 22 and 22R and a bucket (a working tool) 23 attached to tips of the booms 22L and 22R. The boom 22L is arranged leftward of the cabin 5. The boom 22R is arranged rightward of the cabin 5. The booms 22L and 22R are connected to each other by a coupling body (not shown in the drawings) provided between the booms 22L and 22R. The booms 22L and 22R are rotatably supported by a first lift link 24 and a second lift link 25.

A pair of left and right lift cylinders 26, each constituted of a double-acting hydraulic cylinder, are provided at the rear portion of the machine body 2. One ends of the lift cylinders 26 are rotatably connected to a rear lower portion of the machine body 2. The other ends of the lift cylinders 26 are rotatably connected respectively to the booms 22L and 22R. By simultaneously stretching and contracting the lift cylinders 26, the booms 22L and 22R swing up and down simultaneously.

A pair of left and right attachment brackets 27 are provided on a back surface of the bucket 23. The tips of the booms 22L and 22R are rotatably connected to the attachment brackets 27. A pair of left and right tilt cylinders 28, which are double-acting hydraulic cylinders, are provided respectively in front of the booms 22L and 22R. One ends of the tilt cylinders 28 are turnably connected respectively to the attachment brackets 27. The other ends of the tilt cylinders 28 are turnably connected to the booms 22L and 22R. By simultaneously stretching and contracting the tilt cylinder 28, the bucket 23 swings up and down (that is, scooping and dumping operations). By swinging the booms 22L and 22R and the bucket 23, the excavation work and the like can be performed.

The bucket 23 is detachable from the attachment brackets 27. Various types of attachments (that is, hydraulically-driven working tools having hydraulic actuators) can be attached to the attachment brackets 27 in place of the bucket 23. Various types of attachments include, for example, hydraulic crushers, hydraulic breakers, angle brooms, earth augers, pallet forks, sweepers, mowers, snow blowers, and the like. By attaching such various types of attachments to the attachment brackets 27, various types of operations other than the excavation work (or other excavation works) can be performed on the working machine 1.

Traveling devices 4 are provided respectively leftward and rightward on the machine body 2. The traveling devices 4 are crawler-type traveling devices. The traveling devices 4 are hydraulically driven in normal or reverse rotation with an operation fluid supply, and can travel in one direction (that is, a forward-traveling direction) or the other direction (that is, a backward-traveling direction). The machine body 2 and the working machine 1 also travel along with the traveling devices 4. Instead of the crawler type traveling devices 4, wheel type traveling devices having front and rear wheels may be provided on the working machine 1.

A prime mover 29, a fuel tank (not shown in the drawings), an operation fluid tank 31 (see FIG. 1), and the like are arranged inside the machine body (that is, a vehicle body) 2. The prime mover 29 is a diesel engine or a motor generator. Fuel for the prime mover 29 is stored in the fuel tank.

The traveling hydraulic system provided in the working machine 1 will be described below.

FIG. 1 is a view showing an example of the traveling hydraulic system of the working machine 1. In addition to the traveling hydraulic system, the working machine 1 is also provided with a working hydraulic system (not shown in the drawings).

The hydraulic system for the working machine 1 shown in FIG. 1 includes a first hydraulic pump P1 and a second hydraulic pump P2. The hydraulic pumps P1 and P2 are driven by power of the prime mover 29, and output operation fluid after sucking the operation fluid stored in an operation fluid tank 31. The first hydraulic pump P1 is used to drive lift cylinders 26 (see FIG. 11), tilt cylinders 28 (see FIG. 11), and hydraulic actuators provided on various types attachments. The second hydraulic pump P2 (that is, a pilot pump, or a charging pump) is mainly used to supply an operation fluid pressure serving as a control pressure or a signal pressure. For convenience of explanation, the operation fluid serving as a control pressure or a signal pressure is referred to as "pilot fluid" and a pressure of the pilot fluid is referred to as a "pilot pressure".

A first drive circuit 32L and a first traveling unit 21L shown in FIG. 1 are provided in the traveling device 4 (see FIG. 11) arranged rightward on the working machine 1. A second drive circuit 32R and a second traveling unit 21R are provided in the traveling device 4 arranged rightward on the working machine 1. The first drive circuit 32L drives the first traveling unit 21L, and the second drive circuit 32R drives the second traveling unit 21R.

The first drive circuit 32L has a first traveling pump 66L. The first traveling unit 21L has a first traveling motor 57L. The first traveling pump 66L is connected to the first traveling motor 57L by a fluid line. The second drive circuit 32R has a second traveling pump 66R. The second traveling unit 21R has a second traveling motor 57R. The second traveling pump 66R is connected to the second traveling motor 57R by a fluid line.

Each of the traveling pumps 66L and 66R is a swash-plate variable displacement axial pump (that is, an HST pump) to be driven by power of the prime mover 29. Each of the traveling pumps 66L and 66R has a pressure receiver 66a and a pressure receiver 66b to which the pilot pressure, which is a pressure of the pilot fluid, is applied. The pilot pressure applied to each of the pressure receivers 66a and 66b changes angles of swash plates of the traveling pumps 66L and 66R, thereby changing the directions and amounts of operation fluid output from the traveling pumps 66L and 66R.

Each of the first traveling unit 21L and the second traveling unit 21R has traveling motors 57L and 57R, a swash plate switching cylinder 58, and a hydraulic switching valve 63. Each of the traveling motors 57L and 57R is a swash-plate variable displacement axial motor (that is, an HST motor) configured to shift the speed between a high speed and a low speed. The swash plate switching cylinders 58 are capable of being stretched and contracted by a hydraulic pressure of operation fluid and are connected to the swash plates of the corresponding traveling motors 57L and 57R.

The hydraulic switching valve 63 is a two-position switching valve configured to switch in accordance with a pressure of the operation fluid (that is, a pilot pressure). The hydraulic switching valve 63 switches to a second position 63b when the pilot pressure becomes a predetermined pressure or more. The hydraulic switching valve 63 is returned to a first position 63a by an elastic force of the spring when the pilot pressure falls below the predetermined pressure. When the hydraulic switching valve 63 is in the first position 63a, the pilot fluid is released from the swash plate switching cylinder 58, the swash plate switching cylinder 58 contracts, and then the traveling motors 57L and 57R enter the first speed state that is the lower speed. When the hydraulic switching valve 63 is in the second position 63b, the pilot fluid is supplied to the swash plate switching cylinder 58, the swash plate switching cylinder 58 stretches, and then the traveling motors 57L and 57R enter the second speed state that is the higher speed.

An output fluid line 100a is connected to an output port of the second hydraulic pump P2 to deliver the pilot fluid output from the second hydraulic pump P2. From the output fluid line 100a, a first supply line 100b, a second supply line 100c, and a third supply line 100d are branched off. The first supply line 100b is connected to the traveling pumps 66L and 66R. The second supply line 100c is connected to the traveling operation controller 14. The third supply line 100d is connected to the hydraulic switching valve 63.

A directional switching valve 45 constituted of a two-position switching valve is connected to the middle of the third fluid line 100*d*. By switching the directional switching valve 45 to the first position 45*a*, the hydraulic switching valve 63 can be switched to the first position 63*a*. By switching the directional valve 45 to the second position 45*b*, the hydraulic switching valve 63 can be switched to the second position 63*b*. The switching of the directional valve 45 is performed by the controller 75.

The traveling operation device 14 has operation valves 36, 37, 38, and 39, an operation member 40, and shuttle valves 41, 42, 43, and 44. The operation member 40 is a lever-type operation member, and is capable of operating the traveling of the traveling device 4 and the like (including the machine body 2 and the working machine 1).

The operation valves 36, 37, 38, and 39 are operated by a common operation member 40, that is, one operation member 40. Each of the operation valves 36, 37, 38, and 39 is capable of varying, according to the operation of the operation member 40, a pressure of a pilot fluid (that is, an operation fluid) to be output.

In this embodiment, a plurality of operation valves 36, 37, 38, and 39 are operable with the one operation member 40, but as another example, a plurality of operation valves 36, 37, 38, and 39 may be operable with a plurality of lever-type or other types of operation members. For example, a first operation member arranged on one side (that is, the left side) of the driver seat 13 may be used to operate the forward-traveling operation valve 36 and the backward-traveling operation valve 37, and a second operation member arranged on the other side (that is, the right side) of the driver seat 13 may be used to operate the right-turn operation valve 38 and the left-turn operation valve 39.

The forward-traveling operation valve 36 is a valve to operate the forward traveling of the traveling device 4 (that is, the machine body 2 and the working machine 1). The forward-traveling operation valve 36 is connected to the traveling pumps 66L and 66R by a fluid line 46. In detail, the fluid line 46 includes a fluid line 46*a* connected to the pressure receiver 66*a* of the first traveling pump 66L, a fluid line 46*b* connected to the pressure receiver 66*a* of the second traveling pump 66R, and a fluid line 46*c* merging the fluid line 46*a* and the fluid line 46*b*. A first shuttle valve 41 is located in the middle of the fluid line 46*a*, and a second shuttle valve 42 is located in the middle of the fluid line 46*b*. The upstream side of the first shuttle valve 41 in the fluid line 46*a* and the upstream side of the second shuttle valve 42 in the fluid line 46*b* are connected to the fluid line 46*c*. The opposite portion to the merging portion of the fluid line 46*c* is connected to the forward-traveling operation valve 36.

The backward-traveling operation valve 37 is a valve to operate the backward traveling of the traveling device 4 (that is, the machine body 2 and the working machine 1). The backward-traveling operation valve 37 is connected to the traveling pumps 66L and 66R by a fluid line 47. In detail, the fluid line 47 includes a fluid line 47*a* connected to the pressure receiver 66*b* of the first traveling pump 66L, a fluid line 47*b* connected to the pressure receiver 66*b* of the second traveling pump 66R, and a fluid line 47*c* merging the fluid line 47*a* and the fluid line 47*b*. A third shuttle valve 43 is located in the middle of the fluid line 47*a*, and a fourth shuttle valve 44 is located in the middle of the fluid line 47*b*. The upstream side of the third shuttle valve 43 in the fluid line 47*a* and the upstream side of the fourth shuttle valve 44 in the fluid line 47*b* are connected to the fluid line 47*c*. The opposite portion to the merging portion of the fluid line 47*c* is connected to the backward-traveling operation valve 37.

The right-turn operation valve 38 is a valve for operating the right turn of the traveling device 4 (that is, the machine body 2 and the working machine 1). The right-turn operation valve 38, the first shuttle valve 41, and the fourth shuttle valve 44 are connected by a fluid line 48. The left-turn control valve 39 is a valve for operating the left turn of the traveling device 4 (that is, the machine body 2 and the working machine 1). The left-turn control valve 39, the second shuttle valve 42, and the third shuttle valve 43 are connected by a fluid line 49.

When the operation member 40 is swung forward (in a direction indicated by an arrowed line A1 in FIG. 1), the forward-traveling operation valve 36 is operated, and then the operation valve 36 outputs a pilot pressure. This pilot pressure is applied to the pressure receiver 66*a* of the first traveling pump 66L from the first shuttle valve 41 through the fluid line 46*a*, and is also applied to the pressure receiver 66*a* of the second traveling pump 66R from the second shuttle valve 42 through the fluid line 46*b*. In this manner, output shafts 57*a* of the traveling motors 57L and 57R normally rotate (referred to as forward-traveling rotation) at a speed proportional to a swinging amount of the operation member 40, and accordingly the working machine 1 travels straight forward.

When the operation member 40 is swung backward (in a direction indicated by an arrowed line A2 in FIG. 1), the backward-traveling operation valve 37 is operated, and then the operation valve 37 outputs a pilot pressure. This pilot pressure is applied to the pressure receiver 66*b* of the first traveling pump 66L from the third shuttle valve 43 through the fluid line 47*a*, and is also applied to the pressure receiver 66*b* of the second traveling pump 66R from the fourth shuttle valve 44 through the fluid line 47*b*. In this manner, output shafts 57*a* of the traveling motors 57L and 57R reversely rotate (referred to as backward-traveling rotation) at a speed proportional to a swinging amount of the operation member 40, and accordingly the working machine 1 travels straight backward.

When the operation member 40 is swung rightward (in a direction indicated by an arrowed A3 in FIG. 1), the right-turn operation valve 38 is operated, and then the operation valve 38 outputs a pilot pressure. This pilot pressure is applied to the pressure receiver 66*a* of the first traveling pump 66L from the first shuttle valve 41 through the fluid line 46*a*, and is also applied to the pressure receiver 66*b* of the second traveling pump 66R from the fourth shuttle valve 44 through the fluid line 47*b*. In this manner, the output shaft 57*a* of the first traveling unit 21L normally rotates, the output shaft 57*a* of the second traveling unit 21R reversely rotates, and accordingly the working machine 1 turns rightward.

In addition, when the operation member 40 is swung leftward (in a direction indicated by an arrowed A4 in FIG. 1), the left-turn operation valve 39 is operated, and then the operation valve 39 outputs a pilot pressure. This pilot pressure is applied to the pressure receiver 66*a* of the second traveling pump 66R from the second shuttle valve 42 through the fluid line 46*b*, and is also applied to the pressure receiver 66*b* of the first traveling pump 66L from the third shuttle valve 43. In this manner, the output shaft 57*a* of the second traveling unit 21R normally rotates, the output shaft 57*a* of the first traveling unit 21L reversely rotates, and accordingly the working machine 1 turns leftward.

When the operation member 40 is swung in a diagonal direction, such as diagonally forward to the right, diagonally forward to the left, diagonally backward to the right, or diagonally backward to the left, the rotational directions and rotational speeds of the output shafts 57*a* of the first traveling unit 21L and the second traveling unit 21R are changed according to differential pressures between the pilot pressures applied to the pressure receivers 66a and 66b of the traveling pumps 66L and 66R. In this manner, the working machine 1 turns right or left while traveling forward or backward.

That is, when the operation member 40 is swung diagonally forward to the left, the working machine 1 turns left while traveling forward at a speed corresponding to a swing angle of the operation member 40. In addition, when the operation member 40 is swung diagonally forward to the right, the working machine 1 turns right while traveling forward at a speed corresponding to a swing angle of the operation member 40. When the operation member 40 is swung diagonally backward to the left, the working machine 1 turns left while traveling backward at a speed corresponding to a swing angle of the operation member 40. Moreover, when the operation member 40 is swung diagonally backward to the right, the working machine 1 turns right while traveling backward at a speed corresponding to a swing angle of the operation member 40.

The working machine 1 has a controller 75, a display unit 72, a notification unit 73, a camera unit 70, and an operation detector 86. Each of these components 75, 72, 73, 70, and 86 are connected to each other in communication by an on-board network such as a Controller Area Network (CAN) or FlexRay installed into the working machine 1.

The controller 75 is constituted of an ECU (Electronic Control Unit) having a CPU, memory, and the like. The controller 75 controls the operations of the components of the working machine 1.

The camera unit 70 is constituted of a CCD camera with a CCD (Charge Coupled Devices) image sensor, a CMOS camera with a CMOS (Complementary Metal Oxide Semiconductor) image sensor, or an infrared camera. The camera unit 70 is provided, for example, at a front portion, a rear portion, left and right side portions, or a top portion of the working machine 1 (that is, the machine body 2), and is capable of capturing images of the front surroundings, the left surroundings, the right surroundings, or the rear surroundings of the working machine 1 (that is, the machine body 2).

The camera unit 70 is also capable of capturing images of the surroundings of the working machine 1 (for example, the rear, the left and right sides, the front side, and the like) that are blind spots for an operator seated in the driver seat 13. The camera unit 70 may be mounted on an outer surface of the cabin 5, or on an outer surface of the machine body 2 other than the cabin 5, or the like. The mounting location of the camera unit 70 is not limited to these locations.

The display unit 72 is constituted of a stationary display unit or a tablet-type terminal device capable of displaying images. The display unit 72 is arranged in the vicinity of (usually in front of) the driver seat 13 in the cabin 5. The display unit 72 displays an operation screen indicating a revolving speed of the prime mover 29, a fluid temperature of operation fluid, or a water temperature of coolant that cools electric motors or operation fluid. The display unit 72 is configured to display, as shown in FIG. 4, a captured image of the surroundings of the working machine 1 (that is, the machine body 2), the captured image being captured by the camera unit 70.

Figure 4:
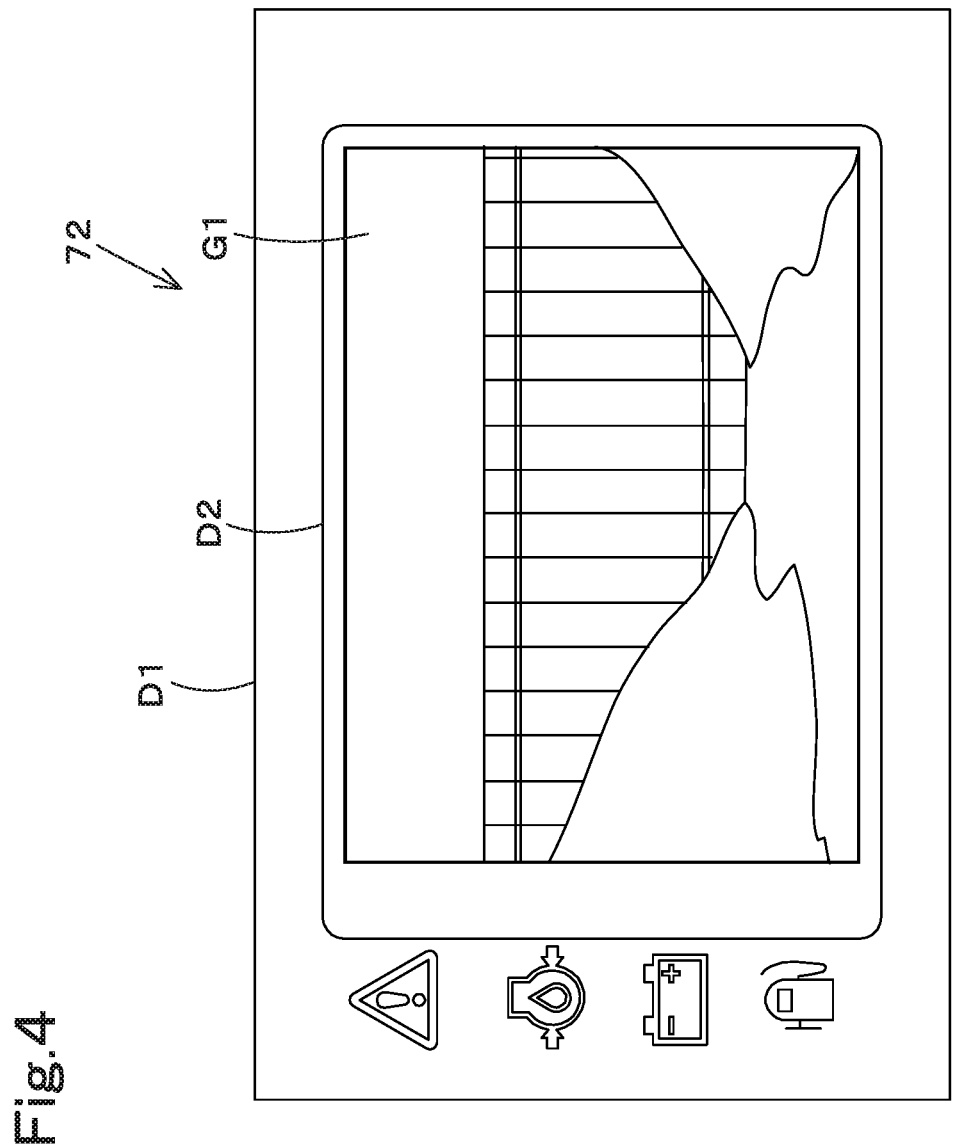
FIG. 4 is a view showing an example of display by the display unit.

In the example shown in FIG. 4, a captured image (by a back monitor) of an area behind the working machine 1 (that is, the machine body 2) captured by the camera unit 70 is displayed on an image display portion D2 in the display screen D1 of the display unit 72. In addition to this, the display unit 72 is capable of displaying, on the image display portion D2, captured images captured by the camera unit 70, that is, a captured image of an area in front of the working machine 1, a captured image of a left area on the working machine 1, a captured image of a right area on the working machine 1, and a captured image of another area around the working machine 1. Among the front, rear, left, and right areas on the working machine 1 (that is, the machine body 2), the camera unit 70 may capture a direction that has a blind spot for an operator seated in the driver seat 13, and the captured images may be displayed on the display unit 72. The controller 75 is capable of controlling the display unit 72 to display the captured images captured by the camera device 70.

The controller 75 relates the captured image to be displayed on the display unit 72 to an operational direction of the operation member 40. For example, when the operation member 40 is operated forward (in a direction indicated by an arrowed line A1 in FIG. 1), the controller 75 controls the display unit 72 to display the captured image of an area in front of the working machine 1 on the image display portion G1 of the display screen D1 of the display unit 72, the captured image being captured by the camera unit 70. When the operation member 40 is operated backward (in a direction indicated by an arrowed line A2 in FIG. 1), the controller 75 controls the display unit 72 to display the captured image of an area behind the working machine 1 on the image display portion G1, the captured image being captured by the camera unit 70.

When the operation member 40 is operated rightward (in a direction indicated by an arrowed line A3 in FIG. 1), the controller 75 controls the display unit 72 to display the captured image of a right area on the working machine 1 on the image display portion G1, the captured image being captured by the camera unit 70. In addition, when the operation member 40 is operated leftward (in a direction indicated by an arrowed line A4 in FIG. 1), the controller 75 controls the display unit 72 to display the captured image of a left area on the working machine 1 on the image display portion G1 the captured image being captured by the camera unit 70.

Instead of capturing all of the front area, rear area, left area, and right area on the working machine 1 (that is, the machine body 2) with the camera unit 70, the camera unit 70 may capture any one of the front area, rear area, left area, and right area. In addition, the camera unit 70 may capture images only in the direction (for example, the backward direction) that has a blind spot for an operator seated in the driver seat 13. Then, when the operation member 40 is operated in the direction corresponding to the direction having the blind spot, the display unit 72 may display the captured image captured in the direction having the blind spot.

The notification unit 73 is constituted of an audio device such as a buzzer or a speaker, a lighting such as LEDs or a lamp, or a display panel different from the display unit 72. For example, the notification unit 73 outputs, from the audio device, a sound or voice notifying of a traveling direction of the traveling devices 4 (that is, the working machine 1 and the machine body 2), for example, the forward traveling, the backward traveling, the left turn, the right turn, or the like, thereby notifying an operator seated in the driver seat 13 or a person around the working machine 1 of the traveling direction. Alternatively, the notification unit 73 lights or flashes lamps or a display portion in the display panel on which marks or letters indicating a traveling direction of the traveling device 4 or the like are attached, thereby notifying the operator or the surroundings of the traveling direction.

Alternatively, the notification unit 73 lights or flashes lamps or the like attached to outer surfaces corresponding to a traveling direction in the traveling devices 4 from among the cabin 5, the machine body 2, or the booms 22L and 22R, thereby notifying the operator or the surroundings of the traveling direction. The controller 75 is capable of controlling the notification unit 73 to notify of a traveling direction of the traveling device 4.

The controller 75 controls, based on operation of the operation member 40, the display unit 72 to start and stop displaying a captured image and the notification unit 73 to start and stop notifying of a traveling direction of the traveling device 4 (that is, the working machine 1 and the machine body 2). In addition, during the operation of the operation member 40, the controller 75 delays one of a timing when the display unit 72 starts to display a captured image and a timing when the notification unit 73 starts to notify of a traveling direction from the other one of the timings.

Furthermore, the controller 75 delays one of a timing when the display unit 72 finishes displaying the captured image and a timing when the notification unit 73 finishes notifying of the traveling direction from the other one of the timings when the operation member 40 is returning to the starting position in a state where the display unit 72 displays the captured image and the notification unit 73 notifies of the traveling direction after the operation member 40 has operated.

Displaying of an captured image by the display unit 72 and notifying of a traveling direction by the notification unit 73, which are controlled by the controller 75, will be described below.

Figure 2:
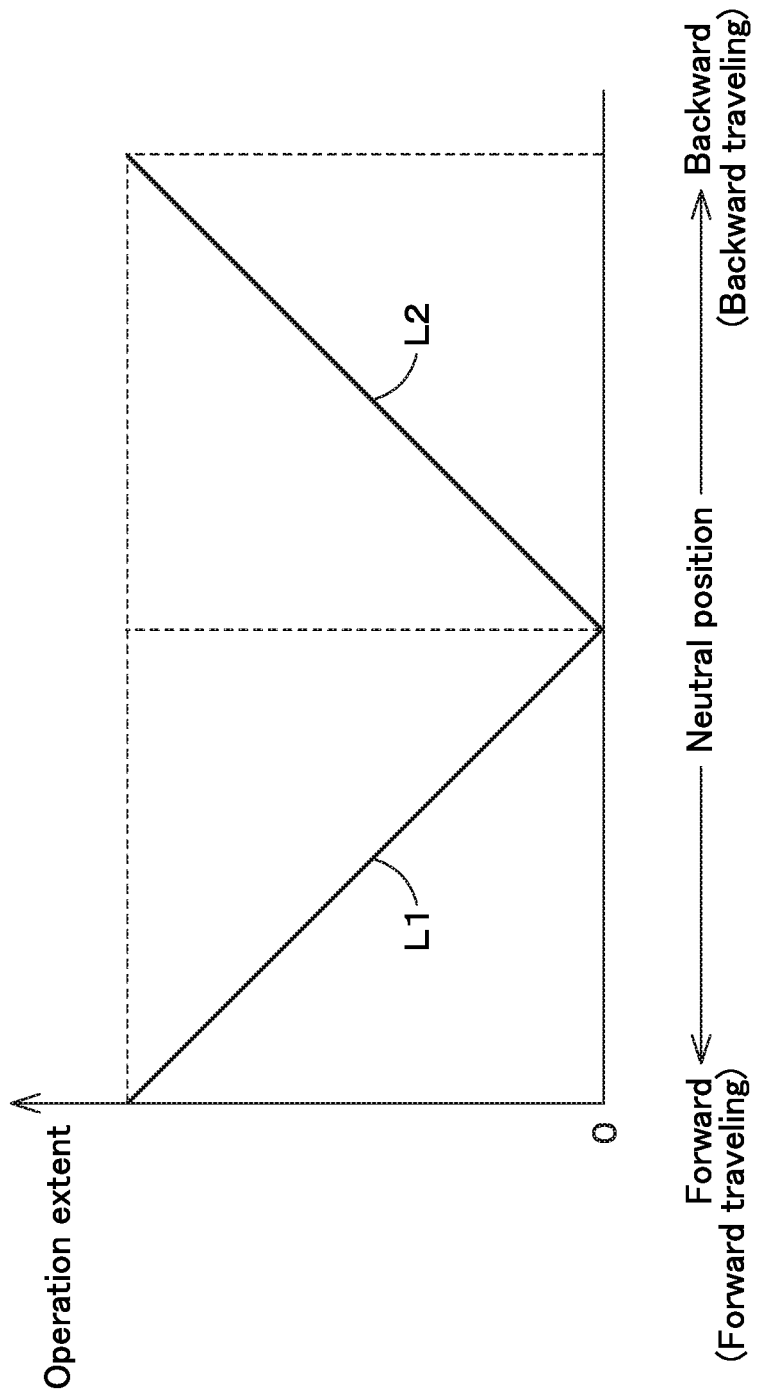
FIG. 2 is a view showing a relationship between an operational direction and operation amount of an operation member.

FIG. 2 is a view showing one relationship between an operational direction and operation amount of the operation member 40.

The operation member 40 is stationary in a neutral position in an unoperated state. As shown by a line L1 in FIG. 2, when the operation member 40 is swung forward from the neutral position (that is, in a forward-traveling operation), a forward operation amount of the operation member 40 toward the front (referred to as a forward-traveling operation amount) gradually increases. Then, when the operation member 40 swung (inclined) forward is swung so as to return to the neutral position (that is, in a return operation), the forward-traveling operation amount of the operation member 40 gradually decreases.

As shown by a line L2 in FIG. 2, when the operation member 40 is swung backward from the neutral position (that is, in a backward-traveling operation), a backward-traveling operation amount of the operation member 40 toward the rear (referred to as a backward-traveling operation amount) gradually increases. Then, when the operation member 40 swung (inclined) backward is swung so as to return to the neutral position (that is, in the return operation), the backward-traveling operation amount of the operation member 40 gradually decreases.

In addition, not shown in the drawings, when the operation member 40 is swung leftward or rightward, the operation amount of the operation member 40 gradually increases, and then when the operation member 40 is swung in the return operation, the operation amount of the operation member 40 gradually decreases in the same manner.

Specifically, when the operation member 40 is swung leftward from the neutral position (referred to as a leftward-traveling operation), the operation amount of the operation member 40 toward the left (referred to as a leftward-traveling operation amount) gradually increases. Then, when the operation member 40 swung (inclined) leftward is swung so as to return to the neutral position (that is, in the return operation), the leftward-traveling operation amount of the operation member 40 gradually decreases. In addition, when the operation member 40 is swung rightward from the neutral position (referred to as a rightward-traveling operation), the operation amount of the operation member 40 toward the right (referred to as a rightward-traveling operation amount) gradually increases. Then, when the operation member 40 swung (inclined) rightward is swung so as to return to the neutral position (that is, in the return operation), the rightward-traveling operation amount of the operation member 40 gradually decreases.

The operation detector 86 (see FIG. 1) is constituted of, for example, a potentiometer or the like, and detects an operation angle of the operation member 40 in each direction and outputs, to the controller 75, an operation signal (that is, an analog voltage signal) corresponding to the detection result. The controller 75 detects the presence or absence of operation, operational direction, and operation amount of the operation member 40 based on the operation signals output from the operation detector 86.

In this detection, for example, when the controller 75 detects, based on the operation signal output from the operation detector 86, that the operation member 40 is being operated, the controller 75 detects an operational direction of the operation member 40. Then, the controller 75 detects an operation angle of the operation member 40 based on the operation signal mentioned above. An operation angle formed when the operation member 40 is maximally swung in each operation direction (the maximum operation angle) is measured in advance and stored in an internal memory of the controller 75. Accordingly, the controller 75 reads out, from the internal memory, the maximum operation angle corresponding to the operational direction of the operation member 40, and calculates, as an operation amount (%) of the operation member 40, a ratio of an operation angle of the operation member 40 (that is, a detection value by the operation detector 86) to the maximum operation angle. The controller 75 also determine a traveling direction of the traveling device 4 (that is, the working machine 1 and the machine body 2) based on an operational direction and the like of the operation member 40.

Figure 3:
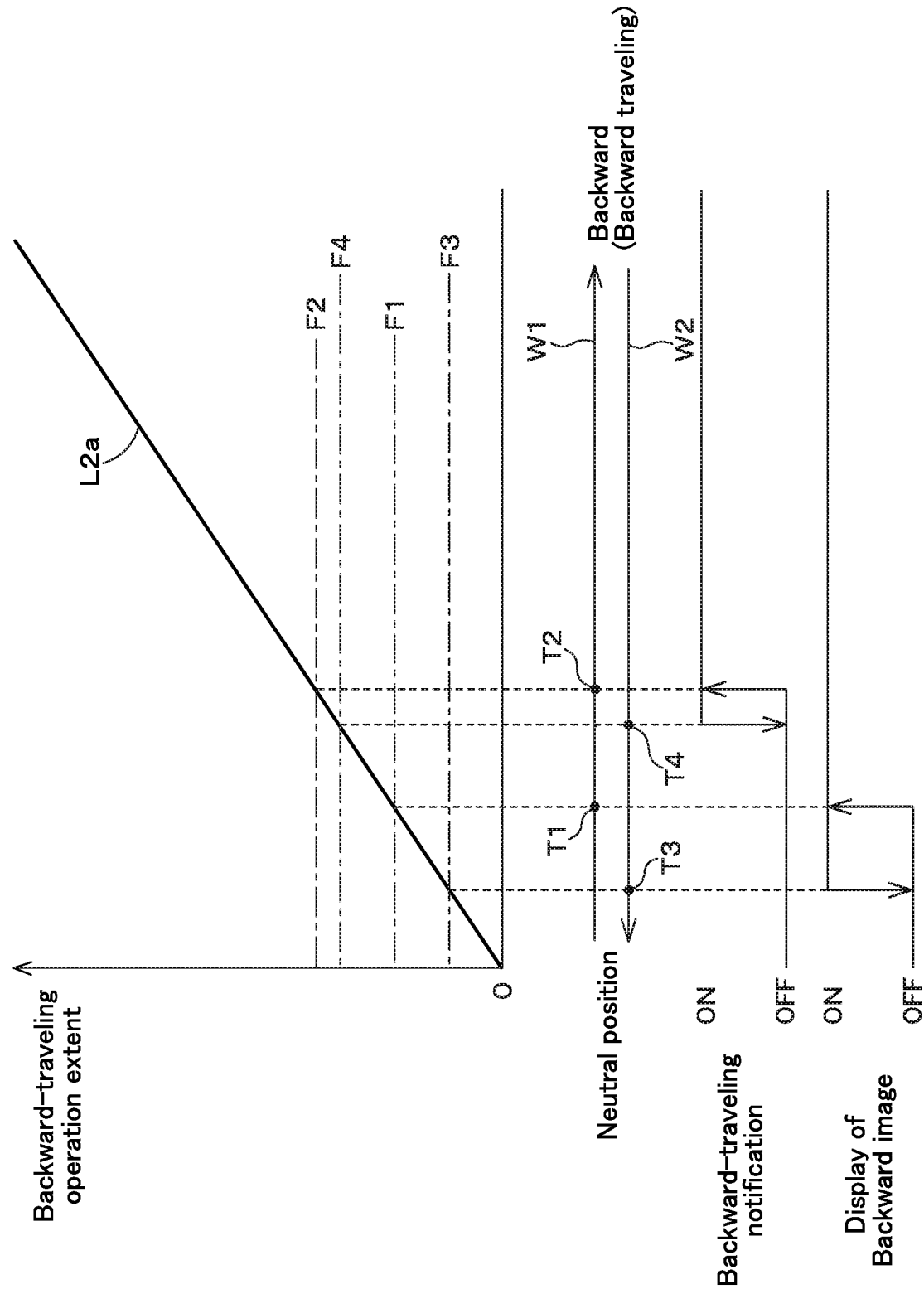
FIG. 3 is a view showing a relationship between operational states of the operation member, a notification unit, a display unit.

FIG. 3 is a view showing one relationship between operation states of the operation member 40, the notification unit 73, and the display unit 72.

When the operation member 40 is operated in the backward-traveling operation from the neutral position (see an arrowed line W1 in FIG. 3), the backward-traveling operation amount of the operation member 40 gradually increases (see a line L2a in FIG. 3). At a timing T1 when the backward-traveling operation amount of the operation member 40 becomes equal to or larger than a predetermined first threshold F1, the controller 75 controls the display unit 72 to start to display a captured image of an area behind the traveling devices 4 (that is, the working machine 1 and the machine body 2), the captured image being captured by the camera unit 70 (see backward image display ON in FIG. 3). Then, at a timing T2 at which the backward-traveling operation amount of the operation member 40 becomes equal to or larger than a predetermined second threshold F2 that is larger than the first threshold F1, the controller 75 controls the notification unit 73 to start to notify of the backward traveling of the traveling devices 4 (that is, the working machine 1 and the machine body 2) (see backward traveling notification ON in FIG. 3).

That is, the controller 75 delays the timing T2 when the notification unit 73 starts to notify the backward traveling from the timing T1 when the display unit 72 starts to display the backward image. In this manner, the display unit 72 starts to display the captured backward image before the notification unit 73 starts notification of the backward traveling.

Then, when the operation member 40 is operated in the return operation back to the neutral position (see an arrowed line W2 in FIG. 3), the backward-traveling operation amount of the operation member 40 gradually decreases (see a line L2a in FIG. 3). In a state where the display unit 72 is displaying the captured backward image and the notification unit is notifying the backward traveling, the controller 75 controls the notification unit 73 to stop the notification of the backward traveling at a timing T4 when the backward-traveling operation amount of the operation member 40 becomes equal to or less than a fourth threshold F4 (see backward-traveling notification OFF in FIG. 3). The fourth threshold F4 is set to a value smaller than the second threshold F2. The controller 75 controls the display unit 72 to finish displaying the captured backward image at a timing T3 when the backward-traveling operation amount of the operation member 40 is equal to or larger than a predetermined third threshold F3 that is smaller than the fourth threshold F4 and the first threshold F1 (see backward image display OFF in FIG. 3). The third threshold F3 is set to a value smaller than the first threshold F1.

That is, the controller 75 delays the timing T3 when the display unit 72 finishes displaying the captured backward image from the timing T4 when the notification unit 73 stops notification of the backward traveling. In this manner, the display unit 72 finishes displaying the captured backward image after the notification unit 73 finishes notifying the backward traveling.

The display unit 72 continuously displays the captured backward image of the working machine 1 until the backward-traveling operation amount of the operation member 40 becomes equal to or less than the third threshold F3 after becoming the first threshold F1 or more. In addition, the backward traveling of the working machine 1 is continuously notified by the notification unit 73 until the backward-traveling operation amount of the operation member 40 becomes equal to or less than the fourth threshold F4 after becoming equal to or larger than the second threshold F2. Furthermore, the displaying of the captured backward image by the display unit 72 continues longer than the notifying of the backward traveling by the notification unit 73.

The thresholds F1 to F4 shown in FIG. 3 are just examples, and the magnitudes of the thresholds F1 to F4 are not limited to those shown in FIG. 3. For example, the second threshold F2 may be set to a value closer to the maximum position, and the first threshold F1 may be set to a value as close to the neutral position as possible.

In the examples in FIG. 3, the second threshold F2 is set to a value larger than the fourth threshold F4, and the first threshold F1 is set to a value larger than the third threshold F3. In this manner, the backward-traveling operation amount of the operation member 40 for starting the backward-traveling notification by the notification unit 73 becomes larger than the backward-traveling operation amount of the operation member 40 for stopping the notification, and the backward-traveling operation amount of the operation member 40 for starting the displaying of the captured backward image by the display unit 72 becomes larger than the backward-traveling operation amount of the operation member 40 for stopping the displaying. In this manner, the time during which both the backward traveling is notified by the notification unit 73 and the displaying of the captured backward image by the display unit 72 is performed can be lengthened.

Accordingly, for example, the fourth threshold F4 may be set to a value equal to or larger than the second threshold F2, or the third threshold F3 may be set to a value equal to or less than the first threshold F1. In this case, after the operation member 40 is operated in the backward-traveling operation and the controller 75 confirmed that the backward-traveling operation amount once becomes larger than the fourth threshold F4, the controller 75 may judge whether the backward-traveling operation amount becomes equal to or less than the fourth threshold F4 and whether the backward-traveling operation amount becomes equal to or less than the third threshold F3 while the operation member 40 is being operated in the returning operation.

In FIG. 3, operations of the operation member 40 in the backward-traveling operation and returning operation after the backward-traveling operation are shown as examples, but are not limited thereto. In the same way, operations of the operation member 40 in the forward-traveling operation and returning operation after the forward-traveling operation, operations of the operation member 40 in the leftward-traveling operation and returning operation after the leftward-traveling operation, and operations of the operation member 40 in the rightward-traveling operation and returning operation after the rightward-traveling operation, the controller 75 controls, based on the operational direction and operation amount of the operation member 40 and the thresholds F1 to F4, the display unit 72 to start and finish displaying a captured image including the traveling direction and the notification unit 73 to start and finish notifying the traveling direction.

It is also possible to perform the displaying of the captured image including the traveling direction by the display unit 72 and the notifying of the traveling direction by the notification unit 73, taking into account the time during which the operation member 40 is being operated. An embodiment in this case will be described with reference to FIG. 5.

Figure 5:
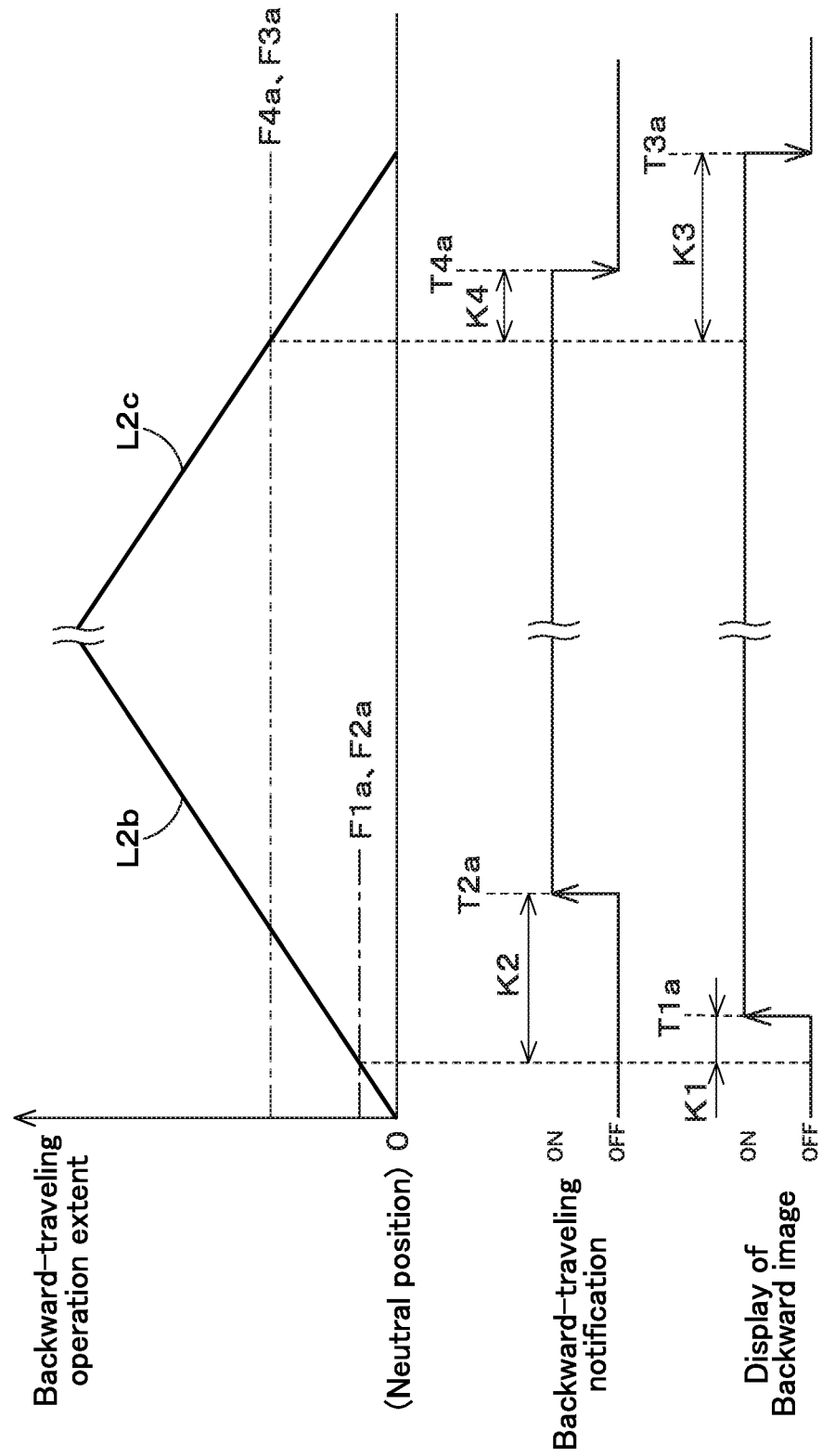
FIG. 5 is a view showing another relationship between the operational states of the operation member, the notification unit, the display unit.

FIG. 5 is a view showing another relationship between the operational states of the operation member 40, the notification unit 73, and the display unit 72.

When the operation member 40 is operated in the backward-traveling operation from the neutral position (see a line L2b in FIG. 5) and then the backward-traveling operation amount of the operation member 40 is equal to or larger than thresholds F1a and F2a, the controller 75 starts timing by the internal memory or the like. When a first predetermined time K1 or more has elapsed with the backward-traveling operation amount of the operation member 40 being equal to or larger than the first threshold F1a, the controller 75 starts to display the captured backward image by the display unit 72 (see backward image display ON in FIG. 5). When a second predetermined time K2 or more has elapsed in a state where the backward-traveling operation amount of the operation member 40 is equal to or larger than the second threshold F2a, the controller 75 starts to notify the backward traveling of the traveling devices 4 (that is, the working machine 1 and the machine body 2) by the notification unit 73 (see backward traveling notification ON in FIG. 5). At this moment, the controller 75 stops the timing.

In the example of FIG. 5, the first threshold F1a and the second threshold F2a are set to the same value (that is, F1a=F2a), and the first predetermined time K1 is set to a shorter time than the second predetermined time K2 (that is, K1<K2). For this reason, the controller 75 delays a timing T2*a* when the notification unit 73 starts to notify the backward traveling later than a timing T1*a* when the display unit 72 starts to display the backward image. Then, the display unit 72 starts to display the captured backward image before the notification unit 73 starts to notify the backward traveling.

As described above, in a state where the display unit 72 is displaying the captured backward image and the notification unit 73 is notifying the backward traveling, the operation member 40 is operated further backward and then the operation member 40 is operated in the returning operation (see a line L2*c* in FIG. 5). In this case, when the backward-traveling operation amount of the operation member 40 becomes equal to or less than the thresholds F3*a* and F4*a*, the controller 75 starts timing by the internal memory or the like. When the fourth predetermined time K4 or more has elapsed with the backward-traveling operation amount of the operation member 40 being equal to or below the fourth threshold F4*a*, the controller 75 controls the notification unit 73 to stop the backward-traveling notification (see backward-traveling notification OFF in FIG. 5). When the third predetermined time K3 or more has elapsed with the backward-traveling operation amount of the operation member 40 being equal to or less than the third threshold F3*a*, the controller 75 controls the display unit 72 to finish displaying the captured backward image (see backward image display OFF). In addition, the controller 75 stops the timing.

In the examples in FIG. 5, the third threshold F3*a* and the fourth threshold F4*a* are set to the same value (that is, F3*a*=F4*a*), and the third predetermined time K3 is set to a time longer than the fourth predetermined time K4 (that is, K3>K4). Accordingly, the controller 75 delays a timing T3*a* when the display unit 72 finishes displaying the backward image from a timing T4*a* when the notification unit 73 finishes notifying the backward traveling. Then, the display unit 72 finishes displaying the captured backward image after the notification unit 73 finishes notifying the backward traveling. A displaying time length for which the display unit 72 displays the captured backward image (the time T1*a* to time T3*a* in FIG. 5) is longer than a notifying time length for which the notification unit 73 notifies the backward traveling (the time T2*a* to time T4*a* in FIG. 5).

The thresholds F1*a* to F4*a* and the predetermined times K1 to K4 shown in FIG. 5 are just examples. The magnitudes of the thresholds F1*a* to F4*a* are not limited to the magnitudes shown in FIG. 5, and the lengths of the predetermined times K1 to K4 are also not limited to the lengths shown in FIG. 5. For example, the first threshold F1*a* may be set to a value different from the second threshold F2*a*, or the third threshold F3*a* may be set to a value different from the fourth threshold F4*a*. In addition, the first predetermined time K1 may be set to be further shorter, or the third predetermined time K3 may be set to be further longer.

In FIG. 5, operation of the operation member 40 in the backward-traveling operation and returning operation after the backward-traveling operation are shown as examples, but are not limited thereto. In the same way, operations of the operation member 40 in the forward-traveling operation and returning operation after the forward-traveling operation, operations of the operation member 40 in the leftward-traveling operation and returning operation after the leftward-traveling operation, and operations of the operation member 40 in the rightward-traveling operation and returning operation after the rightward-traveling operation, the controller 75 controls the display unit 72 to start and finish displaying a captured image including the traveling direction and the notification unit 73 to start and finish notifying the traveling direction, based on the operational direction and operation amount of the operation member 40, the thresholds F1*a* to F4*a*, and the predetermined times K1 to K4.

In the above-described embodiment, the operation detector 86 is provided to detect an operational state of the operation member 40; alternatively, a pressure sensor or the like capable of detecting a pressure of operation fluid that varies according to the operational state of the operation member 40 may be provided. An embodiment of this case will be described with reference to FIG. 6.

Figure 6:
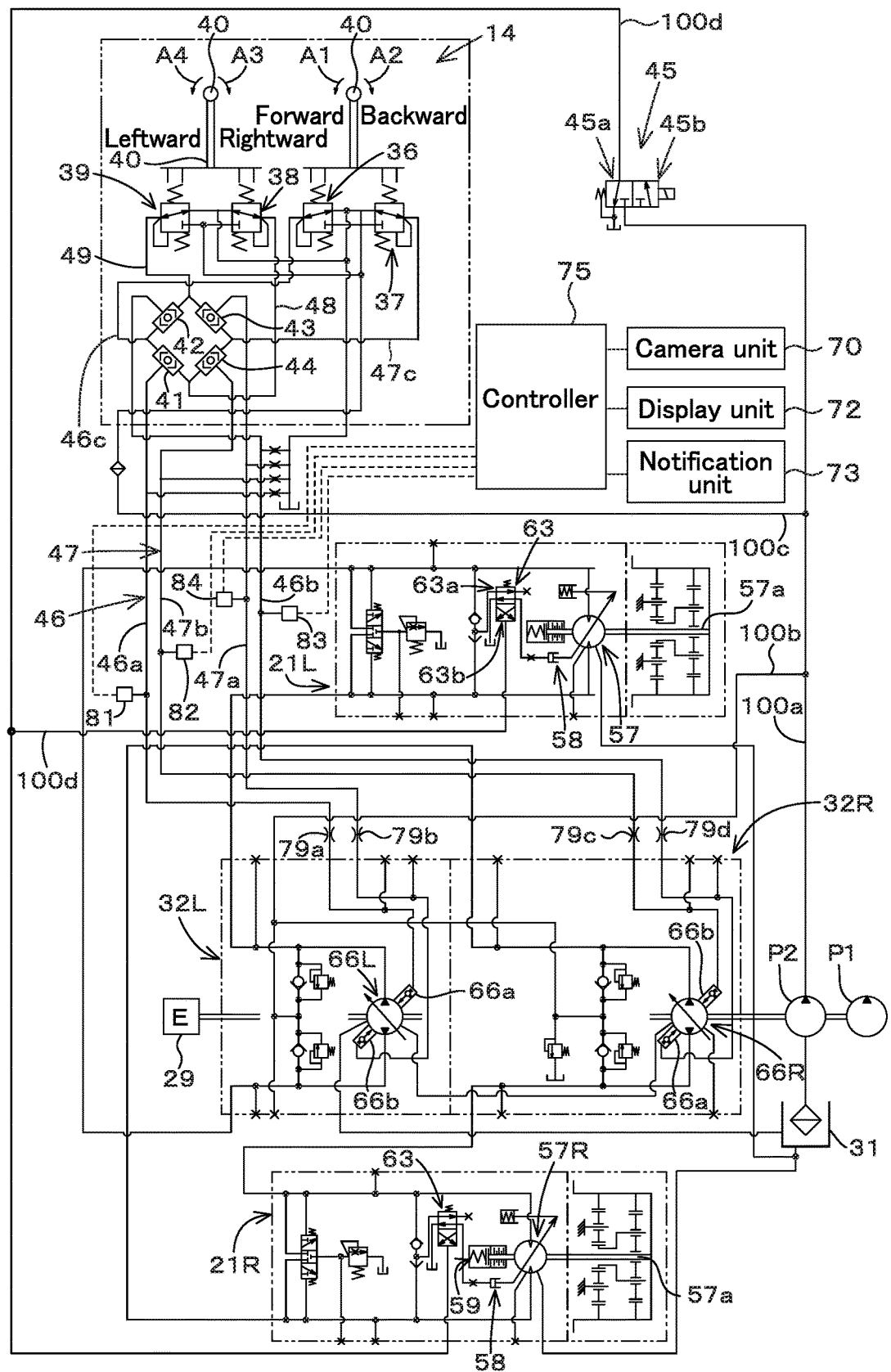
FIG. 6 is a view showing another example of the hydraulic system for the working machine.

FIG. 6 is a view showing another example of the traveling hydraulic system of the working machine 1. The hydraulic system shown in FIG. 6 has pressure detectors 81 to 84 constituted of pressure sensors or pressure switches.

The pressure detector 81 (referred to as a first detector) is connected in parallel to a partial portion 46*a* (referred to as a first fluid line) of the fluid line 46 for delivering operation fluid from the forward-traveling operation valve 36 or the right-turn operation valve 38 to the pressure receiver 66*a* of the traveling pump 66L of the traveling device 4. The pressure detector 81 detects a pressure of pilot fluid flowing in the fluid line 46*a*, that is, a pilot pressure (referred to as a first pressure) applied to the forward-traveling operation valve 36, the right-turn operation valve 38, and the fluid line 46*a*. The pressure detector 83 (referred to as a first detector) is connected in parallel to a partial portion 46*b* (referred to the first fluid line) of the fluid line 46 for delivering operation fluid from the forward-traveling operation valve 36 or the left-turn operation valve 39 to the pressure receiver 66*a* of the traveling pump 66R. The pressure detector 83 detects a pressure of pilot fluid flowing in the fluid line 46*b*, that is, a pilot pressure (referred to as the first pressure) applied to the forward-traveling operation valve 36, the left-turn operation valve 39, and the fluid line 46*b*.

The pressure detector 82 (referred to as a second detector) is connected in parallel to a partial portion 47*b* (referred to as a second fluid line) of the fluid line 47 for delivering operation fluid from the backward-traveling operation valve 37 or the right-turn operation valve 38 to the pressure receiver 66*b* of the traveling pump 66R. The pressure detector 82 detects a pressure of pilot fluid flowing in the fluid line 46*b*, that is, a pilot pressure (referred to as a second pressure) applied to the backward-traveling operation valve 37, the right-turn operation valve 38, and the fluid line 47*b*. The pressure detector 84 (referred to as a second detector) is connected in parallel to a partial portion 47*a* (referred to the second fluid line) of the fluid line 47 for delivering operation fluid from the backward-traveling operation valve 37 or the left-turn operation valve 39 to the pressure receiver 66*b* of the traveling pump 66L. The pressure detector 84 detects a pressure of pilot fluid flowing in the fluid line 47*a*, that is, a pilot pressure (referred to as the second pressure) applied to the backward-traveling operation valve 37, the left-turn operation valve 39, and the fluid line 47*a*.

Downstream of the pressure detectors 81 to 84, throttles 79*a*, 79*c*, 79*d*, and 79*b* are provided. Specifically, the throttle 79*a* is provided downstream (that is, on a traveling pump 66L side) from a connecting point of the pressure detector 81 in the fluid line 46*a*. The throttle 79*c* is provided downstream (that is, on a traveling pump 66R side) from a connecting point of the pressure detector 82 in the fluid line 47*b*. The throttle 79*d* is provided downstream (that is, on a traveling pump 66R side) from a connecting point of the pressure detector 83 in the fluid line 46*b*. The throttle 79*b* is provided downstream (that is, on a traveling pump 66L side)

from a connecting point of the pressure detector 84 in the fluid line 47*a*. In other words, the pressure detectors 81 to 84 are located on portions 36 to 39 respectively upstream (that is, an operation valve 55 side) of the throttles 79*a*, 79*c*, 79*d*, and 79*b*. This allows a pilot pressure output from the operation device 14 to be accurately detected by the pressure detectors 81 to 84.

The controller 75 judges the operational state of the operation member 40 and the traveling direction of the traveling devices 4 (that is, the machine body 2 and the working machine 1) based on the pilot pressures detected by the pressure detectors 81 to 84. The judgment will be described below.

Figure 7:
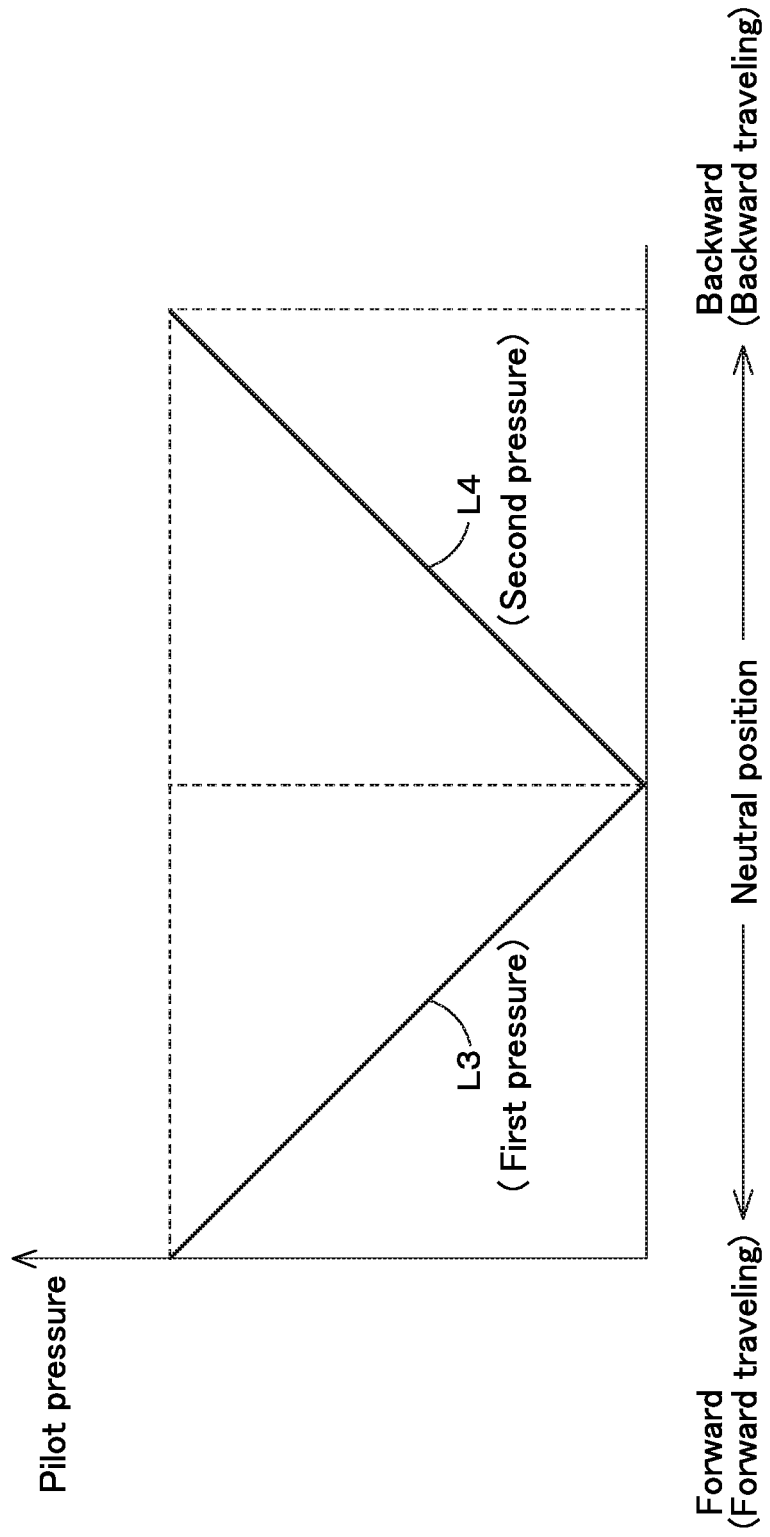
FIG. 7 is a view showing a relationship between the operational state of the operation member, a first pressure, and a second pressure.

FIG. 7 is a view showing one relationship among the forward-traveling and backward-traveling operational states of the operation member 40 and the first and second pressures.

As shown by a line L3 in FIG. 7, when the operation member 40 is operated in the forward-traveling operation from the neutral position, the first pressures (referred to as pilot pressures) applied to the forward-traveling operation valve 36 and fluid lines 46*a* and 46*b* increase in accordance with the increasing in the forward-traveling operation amount of the operation member 40. Then, when the operation member 40 swung forward is operated in the returning operation back to the neutral position, the pilot fluids in the fluid lines 46*a* and 46*b* are drained to the operation fluid tank 31, and thus the first pressures are decreased in accordance with the decreasing in the forward-traveling operation amount of the operation member 40.

As shown by a line L4 in FIG. 7, when the operation member 40 is operated in the backward-traveling operation from the neutral position, the second pressures (referred to as pilot pressures) applied to the backward-traveling operation valve 37 and fluid lines 47*a* and 47*b* increase in accordance with the increasing in the forward-traveling operation amount of the operation member 40. Then, when the operation member 40 swung backward is operated in the returning operation back to the neutral position, the pilot fluids in the fluid lines 47*a* and 47*b* are drained to the operation fluid tank 31, and thus the second pressures are decreased in accordance with the decreasing in the backward-traveling operation amount of the operation member 40.

Although not shown in the drawings, when the operation member 40 is operated in the rightward-traveling operation from the neutral position, the pilot pressures applied to the rightward-traveling operation valve 38 and fluid lines 46*a* and 47*b* increase in accordance with the increasing in the rightward-traveling operation amount of the operation member 40. Then, when the operation member 40 swung rightward is operated in the returning operation back to the neutral position, the pilot fluids in the fluid lines 46*a* and 47*b* are drained to the operation fluid tank 31, and thus the pilot pressures applied to the rightward-traveling operation valve 38 and fluid lines 46*a* and 47*b* are decreased in accordance with the decreasing in the rightward-traveling operation amount of the operation member 40.

Although not shown in the drawings, when the operation member 40 is operated in the leftward-traveling operation from the neutral position, the pilot pressures applied to the leftward-traveling operation valve 39 and fluid lines 46*b* and 47*a* increase in accordance with the increasing in the leftward-traveling operation amount of the operation member 40. Then, when the operation member 40 swung leftward is operated in the returning operation back to the neutral position, the pilot fluids in the fluid lines 46*b* and 47*a* are drained to the operation fluid tank 31, and thus the pilot pressures applied to the leftward-traveling operation valve 39 and fluid lines 46*b* and 47*a* are decreased in accordance with the decreasing in the leftward-traveling operation amount of the operation member 40.

The pressure detectors 81 to 84 detect the pilot pressures in the fluid lines 46*a*, 47*b*, 46*b*, 47*a* and output, to the controller 75, operation signals (that is, analog voltage signals) corresponding to the detection results. The controller 75 detects the presence or absence of operation, operational direction, and operation amount of the operation member 40 based on the operation signals output from the pressure detectors 81 to 84.

In this case, for example, when voltage levels of the operation signals output from any two of the pressure detectors 81 to 84 are certainly higher than voltage levels of the operation signals output from the remaining two of the pressure detectors, the controller 75 determines that the operation member 40 has been operated and that the operation member 40 has been operated in a direction corresponding to the pressure detector that has output the operation signal with the higher voltage level.

Specifically, for example, when voltage levels of the operation signals output from the pressure detectors 81 and 83 are certainly higher than voltage levels of the operation signals output from the pressure detectors 82 and 84, the controller 75 determines that the operation member 40 has been operated and that the operation member 40 has been operated in the backward direction corresponding to the pressure detectors 81 and 83 (that is, in the backward-traveling operation). In addition, when voltage levels of the operation signals output from the pressure detectors 82 and 84 are certainly higher than voltage levels of the operation signals output from the pressure detectors 81 and 83, the controller 75 determines that the operation member 40 has been operated and that the operation member 40 has been operated in the forward direction corresponding to the pressure detectors 82 and 84 (that is, in the backward-traveling operation).

In addition, when voltage levels of the operation signals output from the pressure detectors 81 and 82 are certainly higher than voltage levels of the operation signals output from the pressure detectors 83 and 84, the controller 75 determines that the operation member 40 has been operated and that the operation member 40 has been operated in the rightward direction corresponding to the pressure detectors 81 and 82 (that is, in the rightward-traveling operation). In addition, when voltage levels of the operation signals output from the pressure detectors 83 and 84 are certainly higher than voltage levels of the operation signals output from the pressure detectors 81 and 82, the controller 75 determines that the operation member 40 has been operated and that the operation member 40 has been operated in the leftward direction corresponding to the pressure detectors 83 and 84 (that is, in the leftward-traveling operation).

As another example, when voltage levels of the operation signals output from one of the pressure detectors 81 to 84 is certainly higher than voltage levels of the operation signals output from the remaining one or two of the pressure detectors, the controller 75 may determine that the operation member 40 has been operated and that the operation member 40 has been operated in a direction corresponding to the pressure detector that has output the operation signal with the higher voltage level.

Next, the controller 75 detects the pilot pressures of the corresponding fluid lines 46*a*, 47*b*, 46*b*, and 47*a* based on the operation signals output from the pressure detector, among the pressure detectors 81 to 84, corresponding to the operational direction of the operation member 40. As described above, the pressure detectors corresponding to the operational direction of the operation member 40 are any two of the pressure detectors 81 to 84. Thus, for example, the controller 75 detects the pilot pressure of at least corresponding one of the fluid lines 46a, 47b, 46b, and 47a based on an operation signal output from at least one of the two pressure detectors corresponding to the operational direction of the operation member 40.

As an operation angle of the operation member 40 in each operational direction (forward, backward, rightward, leftward) increases, the pilot pressures of the corresponding fluid lines 46a, 47b, 46b, and 47a increase, and when the operation angle in each of the operational directions reaches a certain degree, the pilot pressures of the corresponding fluid lines 46a, 47b, 46b, and 47a saturates at a constant value (see a line L4a in FIG. 8 to be described below). The pilot pressures (that is, saturation pressures) applied to the corresponding fluid lines 46a, 47b, 46b, and 47a when the operation member 40 is maximally swung in each operational direction are measured in advance and stored in the internal memory of the controller 75.

For this reason, the controller 75 reads out, from the internal memory, the saturation pressure of at least one of the fluid lines 46a, 47b, 46b, and 47a corresponding to the operational direction of the operation member 40, and calculates, as the operation amount (%) of the operation member 40, ratios of the pilot pressures of the fluid lines (detected values by the corresponding of pressure detectors 81 to 84) to the saturation pressure.

At this time, for example, the controller 75 detects a pilot pressure of one of the fluid lines 46a, 47b, 46b, and 47a corresponding to the operational direction of the operation member 40, and when reading out the saturation pressures of the respective fluid lines from the internal memory, the controller 75 calculates, as the operation amount (%) of the actuator 40, a ratio of the pilot pressure of one of the fluid lines to the saturation pressure.

When the controller 75 detects the pilot pressures of the two of the fluid lines, among the fluid lines 46a, 47b, 46b, and 47a, corresponding to the operational direction of the operation member 40, and reads out the saturation pressures of the respective two fluid lines from the internal memory, the controller 75 may calculate, as the operation amount (%) of the operation member 40, an average of a ratio of the pilot pressure of one fluid line to the saturation pressure of one fluid line and a ratio of the pilot pressure of the other fluid line to the saturation pressure of the other fluid line.

Based on the operational direction of the operation member 40 determined as described above, the controller 75 further determines the traveling direction of the traveling devices 4 (that is, the working machine 1 and the machine body 2).

Figure 8:
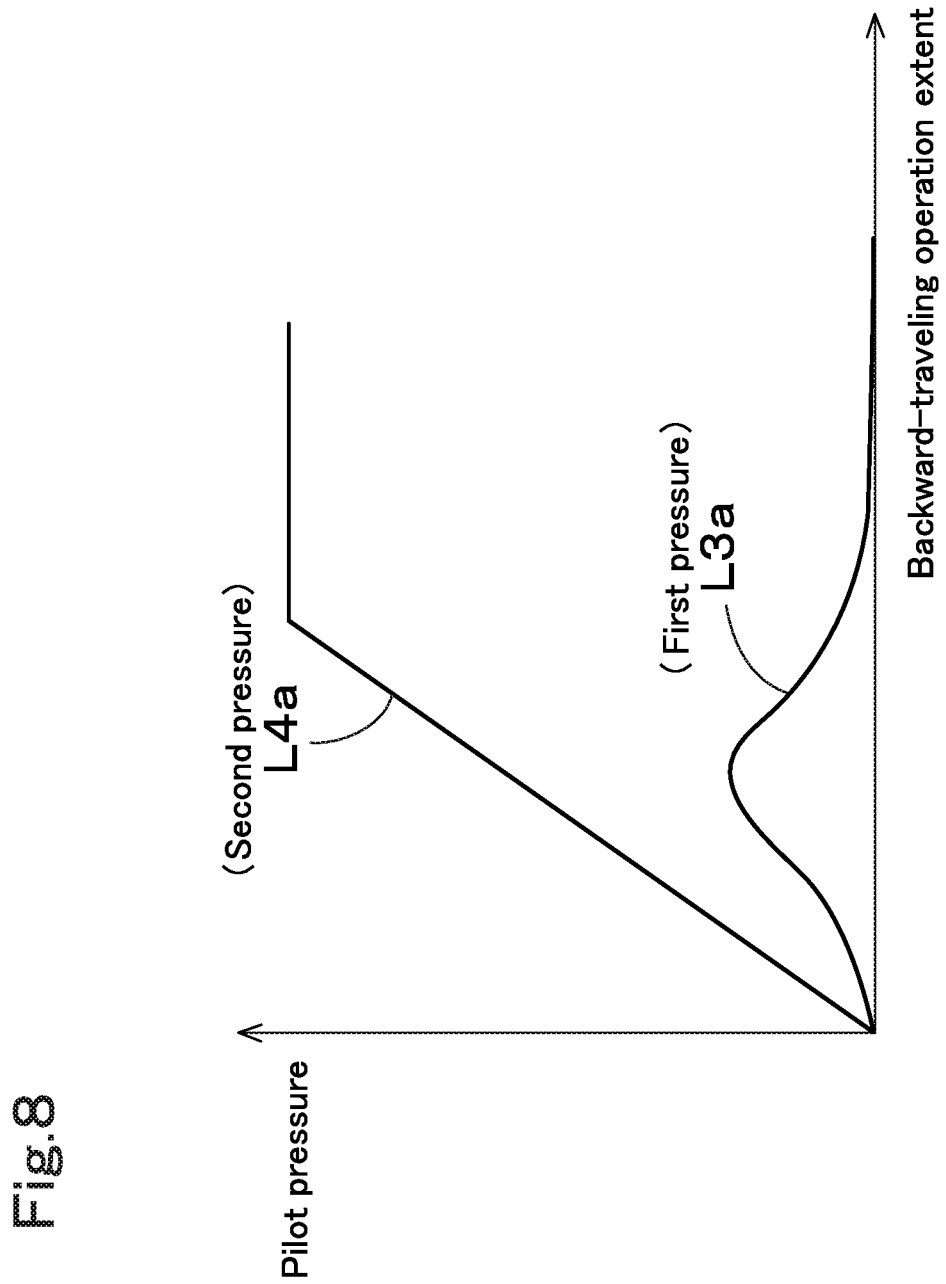
FIG. 8 is a view showing a relationship between a backward-traveling operational state of the operation member, the first pressure, and the second pressure.

FIG. 8 is a view showing another relationship among the backward-traveling operational state of the operation member 40 and the first and second pressures.

As shown in FIG. 6 and the like, the fluid lines 46 (that is, the fluid lines 46a, 46b, and 46c) and the fluid lines 47 (that is, the fluid lines 47a, 47b, and 47c) are respectively connected to pressure receivers 66a and 66b, such as servo cylinders, provided in the traveling pumps 66L and 66R. Accordingly, when the operation member 40 is operated in the backward-traveling operation from the neutral position, not only the second pressures (that is, the pilot pressures in the fluid lines 47a and 47b) may increase as shown by a line L4a in FIG. 8, but also the first pressures (that is, the pilot pressures of the fluid lines 46a and 46b) may temporarily increase as shown by a line L3a, for example. This is because the operation of the servo cylinders of the traveling pumps 66L and 66R (see FIG. 6) causes operation fluid to escape from the pressure receiver 66a opposite to the pressure receiver 66b into the fluid lines 46a and 46b, and thus the pressure is applied to the fluid lines 46a and 46b. In this case, there is a risk of misjudging that the operational direction of the operation member 40 is forward and thus the traveling direction of the traveling devices 4 and the like is forward.

As a countermeasure, the controller 75 determines the operational direction of the operation member 40 and the traveling direction of the traveling device 4 and the like based on a result of comparing the first pressure with the second pressure. Specifically, for example, as shown by the lines L4a and L3a in FIG. 8, when the second pressures (that is, the pilot pressures of the fluid lines 47a and 47b) are equal to or larger than the first pressures (that is, the pilot pressure of the fluid lines 46a and 46a), the controller 75 determines that the operational direction of the operation member 40 is not forward but backward, and that the traveling direction of the traveling device 4 and the like is not forward but backward. That is, when the second pressures are equal to or higher than the first pressure, the controller 75 determines that the operational direction of the operation member 40 is backward and that the traveling direction of the traveling device 4 and the like is backward, even when the first pressures are increasing.

In a case where the operation member 40 is operated in the forward-traveling operation from the neutral position, there is a risk of misjudging that the operational direction of the operation member 40 is backward and the traveling direction of the traveling device 4 and the like is backward as in a case where the operation member 40 is operated in the backward-traveling operation. In this case, when the first pressures are equal to or higher than the second pressure, the controller 75 determines that the operational direction of the operation member 40 is backward and the traveling direction of the traveling device 4 and the like is backward, even when the second pressures are increasing.

In addition, also in a case where the operation member 40 is operated in one of the rightward-traveling operation and the leftward-traveling operation, there is a risk of misjudging that the other one of the rightward-traveling operation and the leftward-traveling operation has been performed and that the direction corresponding to the other one is erroneously judged to be the traveling direction, as in the case of the backward-traveling operation and the forward-traveling operation described above. In this case, for example, by determining the pilot pressures in the fluid lines 46a and 47b corresponding to the rightward-traveling operation as the first pressures and the pilot pressures in the fluid lines 46b and 47a corresponding to the leftward-traveling operation as the second pressures, the controller 75 can determine the operational direction of the operation member 40 and the traveling direction of the traveling device 4 and the like in the same manner as in the case of the backward-traveling operation and the forward-traveling operation described above.

Specifically, when the first pressures (that is, the pilot pressures of fluid lines 46a and 47b) is equal to or higher than the second pressure (that is, the pilot pressures of fluid lines 46b and 47a), the controller 75 determines that the operational direction of the operation member 40 and the traveling direction of the traveling device 4 or the like are to rightward, even when the second pressures are increasing.

When the second pressures are equal to or higher than the first pressures, the controller 75 determines that the operational direction of the operation member 40 and the traveling direction of the traveling device 4 and the like are leftward, even when the first pressures are increasing.

The above configurations enable the controller 75 to properly determine the operational direction of the operation member 40 and the traveling direction of the traveling device 4 and the like. Specifically, even when the outside temperature is low and the viscosity of the operation fluid is low, the operational direction of the operation member 40 and the traveling direction of the traveling device 4 and the like can be properly determined.

As another example, the pressures temporarily applied to the fluid lines 46a, 47b, 46b, and 47a due to the forward-traveling operation, the backward-traveling operation, the rightward-traveling operation, or the leftward-traveling operation of the operation member 40 may be measured in advance, and the pressures larger than the measured pressures may be used as permission values for determining the directions. Alternatively, the minimum pressures in the fluid lines 46a and 46b at which the traveling device 4 and the like start to travel forward, the minimum pressure in the fluid lines 47a and 47b at which the traveling device 4 and the like start to travel backward, the minimum pressure in the fluid lines 46a and 47b at which the traveling device 4 and the like start to turn rightward, and the minimum pressure of the fluid lines 46b and 47a at which the traveling device 4 and the like start to travel rightward may be used as the permission values for determining the directions. In these cases, when the pilot pressure of at least one of the pilot pressures in the fluid lines 46a, 47b, 46b, and 47a respectively detected by the pressure detectors 81 to 84 become equal to or more than the corresponding permission value, the controller 75 may detect the presence or absence of operation, operational direction, and operational amount of the operation member 40 based on the pilot pressures (or one or more pilot pressures that have become equal to or higher than the permission value), and further may determine the traveling direction of the traveling device 4 and the like.

In the case where the operational direction and operation amount of the operation member 40 and the traveling direction of the traveling device 4 and the like are detected based on the operation signals from the pressure detectors 81 to 84, the controller 75 may control the display unit 72 to start and finish displaying the captured image including the traveling direction and the notification unit 73 to start and finish notifying the traveling direction based on the operational direction and operation amount of the operation member 40 and the thresholds F1 to F4 and F1a to F4a, or the predetermined times K1 to K4, as in the examples of FIG. 4 or FIG. 5.

Figure 9:
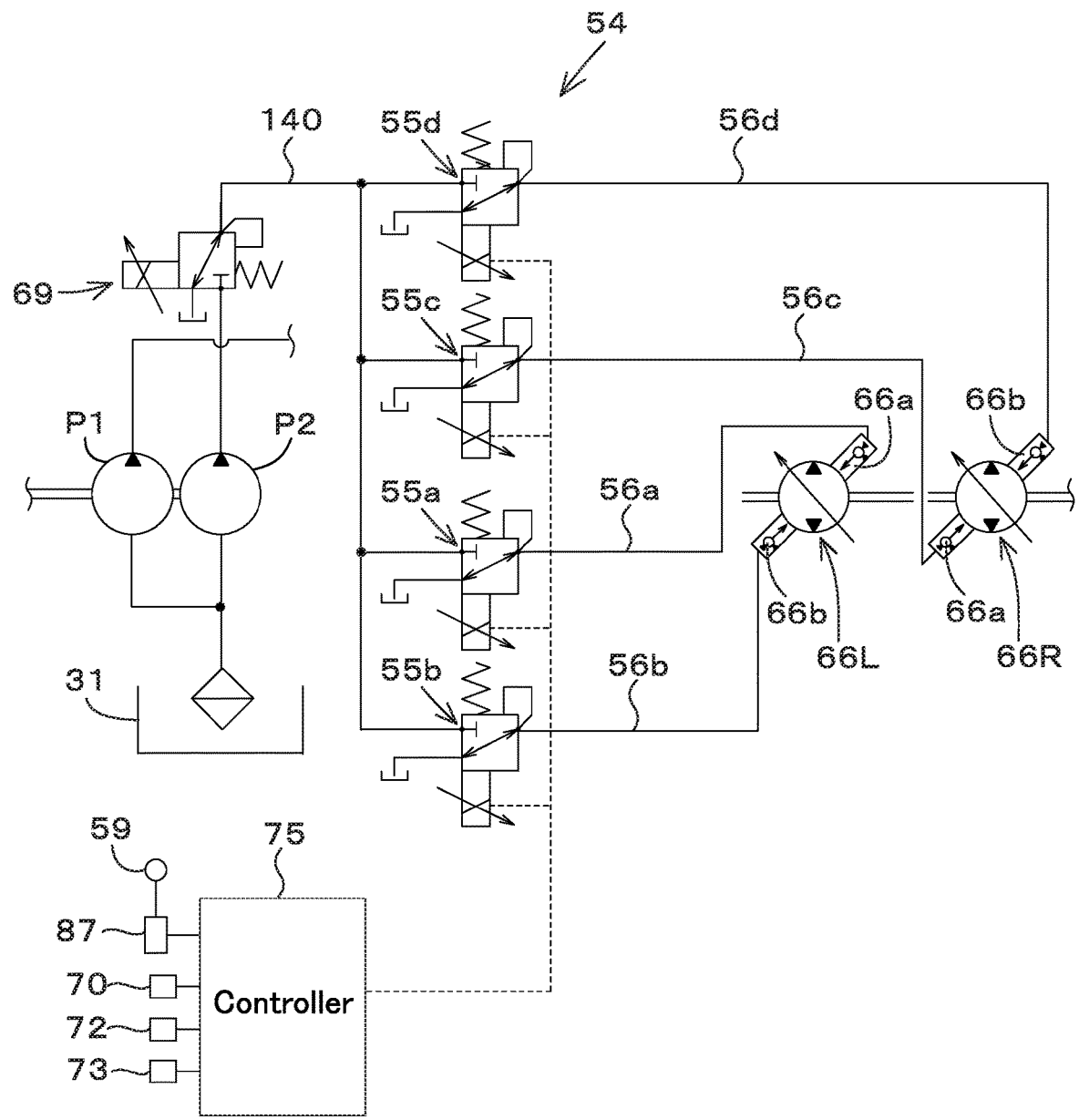
FIG. 9 is a view showing another example of a traveling operation device.
Figure 10:
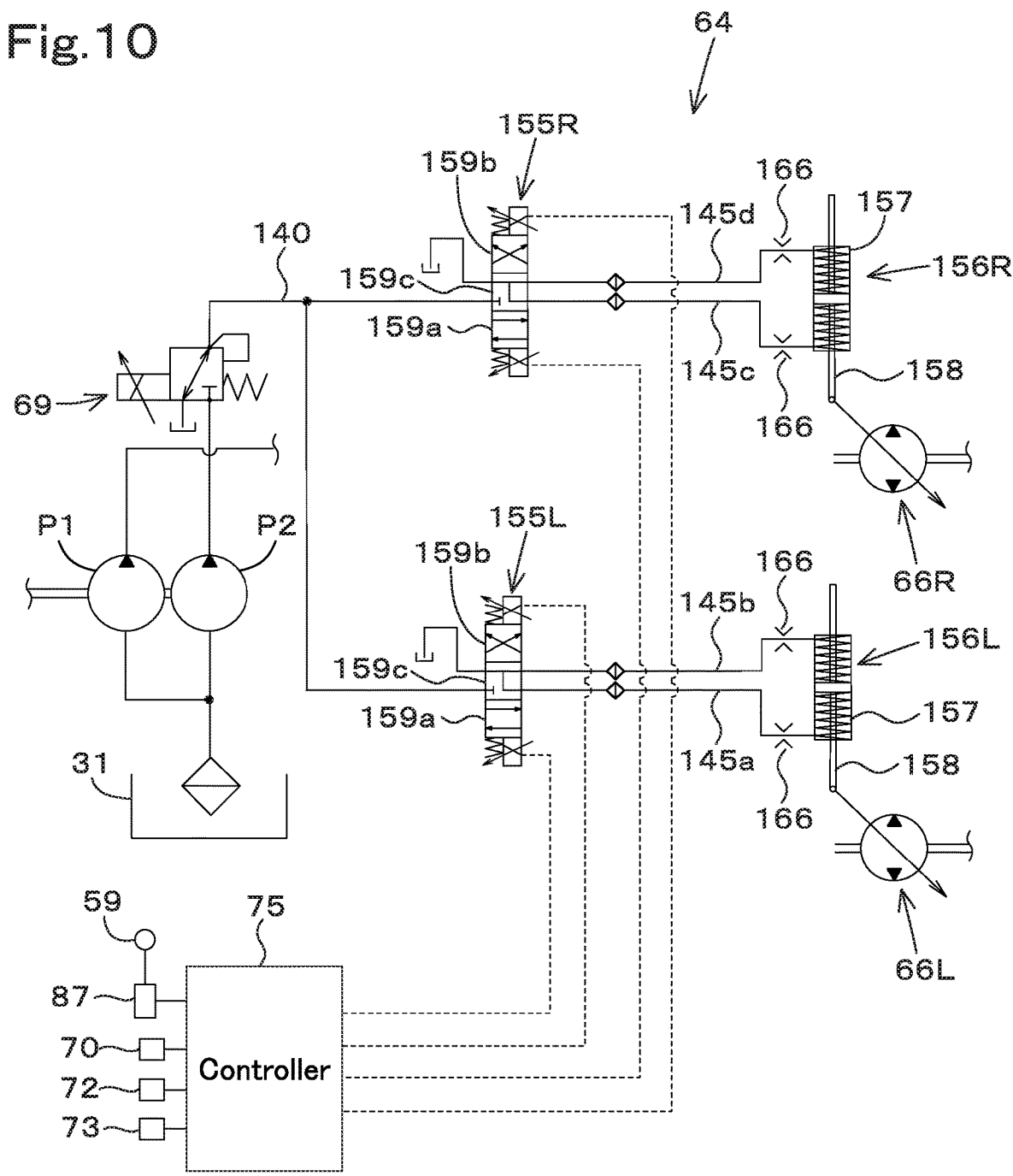
FIG. 10 is a view showing the other example of the traveling operation device.

In the above-described embodiment, the hydraulic traveling operation device 14 configured to change, with the operation valves 36 to 39, the pilot pressures applied to the traveling pumps 66L and 66R is used; alternatively, an electrically-operated traveling operation devices 54 and 64 may be used as shown in FIG. 9 or FIG. 10, for example. In this case, the operation members 59 provided in the traveling operation devices 54 and 64 are constituted of electrically-operated members such as joysticks.

The traveling operation device 54 shown in FIG. 9 has operation valves 55a, 55b, 55c, and 55d constituted of solenoid proportional valves. The input ports of the operation valves 55a, 55b, 55c, and 55d are connected to an output fluid line 140 to which operation fluid is delivered from the second hydraulic pump P2. A solenoid proportional valve 69 is connected to the middle of the output fluid line 140. An output port of the operation valve 55a is connected to the pressure receiver 66a of the traveling pump 66L by the fluid line 45a. An output port of the operation valve 55b is connected to the pressure receiver 66b of the traveling pump 66L by the fluid line 45a. An output port of the control valve 55c is connected to the pressure receiver 66a of the traveling pump 66R by the fluid line 45c. An output port of the operation valve 55d is connected to the pressure receiver 66b of the traveling pump 66R by the fluid line 45d.

The controller 75 is connected to an operation detector 87 configured to detect the operation amount and operational direction of the operation member 59 that is configured to swing in the left-and-right or fore-and-aft direction of the working machine 1. The operation detector 87 is constituted of, for example, a potentiometer or the like, and detects the operation angles of the operation member 59 in the operational directions such as forward, backward, right and left lateral, left-obliquely forward direction, right-obliquely forward direction, left-obliquely backward direction, and right-obliquely backward direction, and outputs, to the controller 75, an operation signal (that is, an analog voltage signal) corresponding to the detection results.

The controller 75 detects the presence or absence of operation, operational direction, and operational extent of the operation member 59 based on the operation signals output from the operation detector 87. The method for detecting an operation state of the operation member 59 is the same as that for detecting the presence or absence of operation, operational direction, and operation amount of the operation member 40 based on the operation signals output from the operation detector 86 (see FIG. 1). The controller 75 controls the operation valves 55a, 55b, 55c, and 55d based on an operational direction and operation amount of the operation member 59 to control the traveling device 4 and the like (that is, the machine body 2 and the working machine 1) to travel.

Specifically, for example, when the operation member 59 is swung forward (that is, in the forward-traveling operation), the controller 75 outputs control signals to the operation valve 55a and the operation valve 55c to tilt the swash plates of the traveling pumps 66L and 66R in respective directions to deliver operation fluid from the traveling pumps 66L and 66R in respective flow directions to rotate the respective traveling motors 57L and 57R (and their output shafts 57a) in respective normal directions (in respective forward traveling directions). In this manner, the traveling motors 57L and 57R normally rotate, and thus the traveling devices 4 and the like (that is, the working machine 1 or the machine body 2) travel forward. When the operation member 59 is swung backward (that is, in the backward-traveling operation), the controller 75 outputs control signals to the operation valve 55b and the operation valve 55d to tilt the swash plates of the traveling pumps 66L and 66R in respective directions to deliver operation fluid from the respective traveling pumps 66L and 66R in respective flow directions to rotate the respective traveling motors 57L and 57R (and their output shafts 57a) in respective reverse directions (in respective backward traveling directions). In this manner, the traveling motors 57L and 57R reversely rotate, and thus the traveling devices 4 and the like travel backward.

When the operation member 59 is swung rightward (that is, in the rightward-traveling operation), the controller 75 outputs a control signal to the operation valve 55a to tilt the swash plate of the traveling pump 66L in the direction to deliver operation fluid from the traveling pump 66L in the flow direction to rotate the traveling motor 57L (and its output shaft 57a) in the normal direction, and outputs a control signal to the operation valve 55d to tilt the swash plate of the traveling pump 66R in the direction to deliver operation fluid from the traveling pump 66R in the flow direction to rotate the traveling motor 57R (and its output shaft 57a) in the reverse direction. In this manner, the traveling motor 57L normally rotates and the traveling motor 57R reversely rotates, and thus the traveling devices 4 and the like turn right. In addition, when the operation member 59 is swung leftward (that is, in the leftward-traveling operation), the controller 75 outputs a control signal to the operation valve 55b to tilt the swash plate of the traveling pump 66L in the direction to deliver operation fluid from the traveling pump 66L in the flow direction to rotate the traveling motor 57L (and its output shafts 57a) in the reverse direction, and outputs a control signal to the operation valve 55c to tilt the swash plate of the traveling pump 66R in the direction to deliver operation fluid from the traveling pump 66R in the flow direction to rotate the traveling motor 57R (and its output shaft 57a) in the normal direction. In this manner, the traveling pump 66L reversely rotates and the traveling pump 66R normally rotates, and thus the traveling devices 4 and the like turn left.

The traveling operation device 64 shown in FIG. 10 has operation valves 155L and 155R and hydraulic regulators 156L and 156R. Each of the hydraulic regulators 156L and 156R has a supply chamber 157 to which operation fluid can be supplied and a piston rod 158 provided in the supply chamber 157. The piston rod 158 of the hydraulic regulator 156L is connected to the swash plate of the traveling pump 66L. The piston rod 158 of the hydraulic regulator 156R is connected to the swash plate of the traveling pump 66R. The angles of the swash plates of the traveling pump 66L and 66R are changed by actuation (that is, straight-line movement) of the piston rods 158 of the hydraulic regulator 156L and 156R.

The operation valve 155L is a solenoid proportional valve that operates the hydraulic regulator 156L and is switchable between a first position 159a, a second position 159b, and a neutral position 159c. The position of the operation valve 155L is switched by moving a spool of the operation valve 155L based on a control signal output from the controller 75. The first output port of the operation valve 155L is connected to the supply chamber 157 of the hydraulic regulator 156L by the fluid line 145a. The second output port of the operation valve 155L is connected to the supply chamber 157 of the hydraulic regulator 156L by the fluid line 145b. The input port of the operation valve 155L is connected to an output fluid line 140 to which operation fluid is delivered from the second hydraulic pump P2. The solenoid proportional valve 69 is connected to the middle of the output fluid line 140.

The operation valve 155R is a solenoid proportional valve that operates the hydraulic regulator 156R and is switchable between the first position 159a, the second position 159b, and the neutral position 159c. The position of the operation valve 155R is switched by moving a spool of the operation valve 155R based on a control signal output from the controller 75. The first output port of the operation valve 155R is connected to the supply chamber 157 of the hydraulic regulator 156R by the fluid line 145c. The second output port of the operation valve 155R is connected to the supply chamber 157 of the hydraulic regulator 156R by the fluid line 145d. The input port of the operation valve 155R is connected to the output fluid line 140 to which operation fluid is delivered from the second hydraulic pump P2.

The controller 75 outputs control signals to the operation valve 155L and the operation valve 155R to switch the operation valve 155L and the operation valve 155R to the respective first positions 159A. In this manner, the swash plates of the traveling pumps 66L and 66R are tilted in the respective directions to deliver operation fluid from the traveling pumps 66L and 66R in the respective flow directions to normally rotate the traveling motors 57L and 57R, thereby enabling normal rotation of the traveling motors 57L and 57R. In addition, the controller 75 outputs control signals to the operation valves 155L and 155R to switch the operation valves 155L and 155R to the respective second positions 159b. In this manner, the swash plates of the traveling pumps 66L and 66R are tilted in the respective directions to deliver operation fluid from the traveling pumps 66L and 66R in the respective flow directions to reversely rotate the traveling motors 57L and 57R, thereby enabling reverse rotation of the traveling motors 57L and 57R.

The controller 75 outputs a control signal to the operation valve 155L to switch the operation valve 155L to the first position 159a and outputs a control signal to the operation valve 155R to switch the operation valve 155R to the second position 159b. In this manner, the swash plate of the traveling pump 66L is tilted in the direction to deliver operation fluid from the traveling pump 66L in the flow direction to normally rotate the traveling motor 57L, thereby enabling the traveling motor 57L to rotate normally, and the swash plate of the traveling pump 66R is tilted in the direction to deliver operation fluid from the traveling pump 66R in the flow direction to reversely rotate the traveling motor 57R, thereby enabling the traveling motor 57R to rotate reversely.

Moreover, the controller 75 outputs a control signal to the operation valve 155L to switch the operation valve 155L to the second position 159b and outputs a control signal to the operation valve 155R to switch the operation valve 155R to the first position 159a. In this manner, the swash plate of the traveling pump 66L is tilted in the direction to reversely rotate the traveling motor 57L, thereby enabling the traveling motor 57L to rotate reversely, and the swash plate of the traveling pump 66R is tilted in the direction to normally rotate the traveling motor 57R, thereby enabling the traveling motor 57R to rotate normally.

In the above-described embodiment, the controller 75 calculates an operation amount of the operation member 40 based on operation angles of the operation members 40 and 59 detected according to the operation signals from the operation detectors 86 and 87, or based on the pilot pressures in the fluid lines 46c, 47c, 48, and 49 detected according to on the operation signals from the pressure detectors 81 to 84; however, a calculation method is not limited to the method. In addition to the method, for example, the controller 75 may use the operation angles of the operation members 40 and 59 as the operation amounts of the operation members 40 and 59, or the pilot pressures in the fluid lines 46c, 47c, 48, and 49 as the operation amount of the operation member 40. In these cases, it is sufficient to use predetermined angles or predetermined pressures as the thresholds F1 to F4 and F1a to F4a for controlling the display unit 72 to start and finish displaying the captured image including the traveling direction and the notification unit 73 to start and finish notifying the traveling direction.

In the above-mentioned embodiment, the operation member 40 is returned to the neutral position (a state before being operated) in the returning operation, but the operation member 40 may be returned to the neutral position by an elastic force of elastic member such as a spring even without the returning operation. Similarly, the operation member 59 may be returned to the neutral position without the returning operation.

In the above-described embodiment, when the operation members 40 and 59 are operated from the neutral position, the display unit 72 displays a captured image including the traveling direction of the traveling device 4 or the like, the traveling direction corresponding to the operation direction; however, the method is not limited thereto. For example, when the operation members 40 and 59 are operated in the backward-traveling operation, the display unit 72 may display side by side both a captured forward image and a captured backward image including the traveling direction determined by the operation device 4, that is, the display unit 72 may display both a captured image including the traveling direction and a captured image including a direction different from the operational direction. In addition, only the captured image including the direction different from the traveling direction corresponding to the operational directions of the operation members 40 and 59 may be displayed on the display unit 72.

Further, a captured forward image, a captured backward image, a captured leftward image, and a captured rightward image of the machine body 2 captured by the camera unit 70 may be combined by an image processor to create an omnidirectional captured image (so-called an omnidirectional monitor) such as a bird's-eye view around the working machine 1, and the display unit 72 may display the omnidirectional captured image when the operation members 40 and 59 are operated.

According to the above embodiment, the working machine 1 has the following configurations and provides the following effects.

The working machine 1 of the present embodiment includes the machine body 2, the traveling device 4 provided with the machine body 2, the operation member 40 or 59 operable to activate the traveling device 4, the camera device 70 to capture an image of surroundings of the machine body 2, the display unit 72 to display the image captured by the camera device 70, the notification unit 73 to notify a traveling direction of the traveling device 4, and the controller 75 to control the display unit 72 and the notification unit 73 so that when the operation members 40 and 59 are operated, the display unit 72 is controlled to display the captured image and the notification unit 73 is controlled to notify the traveling direction. The controller 75 delays either one of the timing T1 or T1a when the display unit 72 starts to display the captured image and the timing T2 or T2a when the notification unit 73 starts to notify the traveling direction later than the other.

According to the above configuration, when the operation member 40 or 59 is operated, the timing T1 or T1a when the display unit 72 starts to display the captured image is different from the timing T2 or T2a when the notification unit 73 starts to notify the traveling direction. In this manner, an operator of the working machine 1 or a person around the working machine 1 can separately recognize the start of display of the captured image and the start of notification of the traveling direction. In addition, for example, even when one of the displays of captured image and traveling direction is executed without the operator's intention, the operator can be made aware that the other one is to be executed based on the start of the one. As the result, it is possible to improve convenience by effectively displaying the captured image and notifying the traveling direction.

In the present embodiment, the controller 75 delays the timing T2 or T2a when the notification unit 73 starts to notify the traveling direction later than the timing T1 or T1a when the display unit 72 starts to display the captured image. In this manner, the operator can see the captured image around the working machine 1, the captured image being displayed by the display unit 72, through operation of the operation member 40 or 59, before recognizing the notification of the traveling direction of the working machine 1, thereby improving the workability in the working machine 1.

In the present embodiment, the controller 75 controls the display unit 72 to start to display the captured image when an operation amount of the operation member 40 or 59 becomes the threshold F1 or F1a or more, and controls the notification unit 73 to stat to notify the traveling direction when operation amount of the operation member 40 or 59 becomes the threshold F2 or F2a or more. In this manner, when the operation member 40 or 59 is operated, either one of the timing T1 or T1a when the display unit 72 starts to display the captured image and the timing T2 or T2a when the notification unit 73 starts to notify the traveling direction can be reliably delayed later than the other timing. In addition, by changing the operation amount of the operation member 40 or 59, the operator can intentionally decide to execute or not to execute the display of the captured image by the display unit 72 and the notification of the traveling direction by the notification unit 73. In addition, by setting the thresholds F1 or F1a and F2 or F2a to small values, it is possible to control the display unit 72 to display the captured image and the notification unit 73 to notify the traveling direction without increasing the operation amount of the operation member 40 or 59. Furthermore, by setting the thresholds F1 or F1a and F2 or F2a to large values, when the operation amount of the operation member 40 or 59 is small, such as when the operation member 40 or 59 is operated incorrectly, it is possible to prevent the display unit 72 from displaying the captured image or the notification unit 73 from notifying the traveling direction.

In this embodiment, the first threshold F1 or F1a is smaller than the second threshold F2 or F2a. According to this configuration, when the operation member 40 or 59 is performed, the timing T2 or T2a when the notification unit 73 starts to notify the traveling direction can be delayed later than the timing T1 or T1a when the display unit 72 starts to display the captured image. Then, through operation of the operation member 40 or 59, the notification unit 73 can notify the traveling direction after the display unit 72 starts to display the captured image. In addition, by setting the operation amount of the operation member 40 or 59 to be equal to or more than the first threshold F1 or F1a and less than the second threshold F2 or F2a, the operator can cause only the displaying of a captured image by the display unit 72 to be performed without causing the notifying of a traveling direction by the notification unit 73 to be performed. In addition, by setting the operation amount of the operation member 40 or 59 to be equal to or more than the second threshold F2 or F2a, the operator can cause both the displaying of the captured image by the display unit 72 to be performed and the notifying of the traveling direction by the notification unit 73 to be performed. Furthermore, by setting the second threshold F2 or F2a to be a large value, the operation amount of the operation member 40 or 59 can be increased to cause the notifying of the traveling direction by the notification unit 73 to be performed, and the timing T2 or T2a when the notification is started can be matched with the timing when the working machine 1 starts to travel in the traveling direction.

In this embodiment, the controller 75 controls the display unit 72 to start to display the captured image after an operation amount of the operation member 40 or 59 not less than the first threshold F1 or F1a is kept for the first predetermined time K1 or longer, and the controller 75 controls the notification unit 73 to start to notify the traveling direction after the operation amount of the operation member 40 or 59 not less than the second threshold F2 or F2a is kept for the second predetermined time K2 or longer. According to this configuration, even when the first threshold F1 or F1a and the second threshold F2 or F2a are set to the same value, once the operation member 40 or 59 is operated to activate the traveling device 4, the timing T2 or T2a to start the notification of the traveling direction by the notification unit 73 can be delayed later than the timing T1 or T1a to start the displaying of the captured image by the display unit 72. In addition, by changing the operation amount and operation time of the operation member 40 or 59, the operator can intentionally decide to execute or not to execute the displaying of the captured image by the display unit 72 and the notifying of the traveling direction by the notification unit 73. In addition, by setting the predetermined times K1 and K2 to be short, it is possible to control the display unit 72 to display the captured image and the notification unit 73 to notify the traveling direction without lengthening the time to hold the operation amount of the operation member 40 or 59 not less than the threshold F1, F1a, F2, or F2a. Furthermore, by setting the predetermined times K1 and K2 to be long, when the operation amount of the operation member 40 or 59 not less than the threshold F1, F1a, F2, or F2a is kept for a short time, such as when the operation member 40 or 59 is operated incorrectly, it is possible to control the display unit 72 not to display the captured image or the notification unit 73 not to notify the traveling direction.

In this embodiment, the first predetermined time K1 is shorter than the second predetermined time K2. According to this configuration, when the operation member 40 or 59 is operated, the timing T2 or T2a to start the notification of the traveling direction by the notification unit 73 can be delayed later than the timing T1 or T1a to start the displaying of the captured image by the display unit 72. Then, by simply operating the operation member 40 or 59, the display unit 72 can display the captured image to cause an operator to be notified before the notification unit 73 starts to notify the traveling direction of the working machine 1. In addition, after an operator holds the operation member 40 or 59 at the operation amount not less than any of the thresholds F1, F1a, F2, and F2a for the first predetermined time K1 or longer that is shorter than the second predetermined time K2, it is possible to perform only the displaying of a captured image by the display unit 72 without performing the notifying of the traveling direction by the notification unit 73. In addition, after an operator holds the operation member 40 or 59 at the operation amount not less than any of the thresholds F1, F1a, F2, and F2a for the second predetermined time K2 or longer, it is possible to perform both the displaying of a captured image by the display unit 72 and the notifying of the traveling direction by the notification unit 73. Furthermore, by setting the second predetermined time K2 to be long, the notification unit 73 can start to notify the traveling direction when the operation amount of the operation member 40 or 59 becomes large, and the timings T2 and T2a to start the displaying and the notifying and the timing when the working machine 1 starts to travel in the traveling direction can be matched with each other.

A working machine of the present invention includes the machine body 2, the traveling device 4 provided with the machine body 2, the operation member 40 or 59 operable to activate the traveling device 4, the camera device 70 to capture an image of surroundings of the machine body 2, the display unit 72 to display the image captured by the camera device 70, the notification unit 73 to notify a traveling direction of the traveling device 4, and the controller 75 to control the display unit 72 and the notification unit 73 so that when the operation member 40 or 59 is operated, the display unit 72 is controlled to display the captured image and the notification unit 73 is controlled to notify the traveling direction, and so that when the operation member 40 or 59 having been operated to activate the traveling device 4 is returned to an unoperated state, the display unit 72 is controlled to finish displaying the captured image at the timing T3 or T3a and the notification unit 73 is controlled to finish notifying the traveling direction at the timing T4 or T4a. The controller 75 delays either one of the timing T3 or T3a and the timing T4 or T4a later than the other.

According to the above, after the operation members 40 and 59 start performing the operation and then the controller 75 starts to control the display unit 72 to display the captured image and the notification unit 73 to notify the traveling direction, the timings T3 and T3a when the display unit 72 finishes displaying the captured image are different from the timings T4 and T4a when the notification unit 73 finishes notifying the traveling direction, when the operation members 40 and 59 stop performing the operation. In this configuration, an operator of the working machine 1 or a person around the working machine 1 can recognize the end of the displaying of the captured image and the end of the notifying of the traveling direction separately. For example, even when one of the displaying of captured image and the notifying of a traveling direction is stopped without the operator's intention, the operator can be made aware that the other one is to be stopped based on the stop of the one. As the result, it is possible to improve convenience by effectively displaying the captured image and notifying the traveling direction.

In the present embodiment, the controller 75 delays the timings T3 and T3a when the display unit 72 finishes displaying the captured image from the timings T4 and T4a when the notification unit 73 finishes notifying the traveling direction. In this configuration, the operator can see a captured image displayed by the display unit 72 even after the notification of the traveling direction of the working machine 1 is stopped, thereby improving the workability in the working machine 1.

In the present embodiment, the controller 75 controls the display unit 72 to finish displaying the captured image when operation amount of the operation member 40 or 59 becomes the third threshold F3 or F3a or less, and the controller 75 controls the notification unit 73 to finish notifying the traveling direction when the operation amount of the operation member 40 or 59 becomes the fourth threshold F4 or F4a or less. In this configuration, when the operation member 40 or 59 is returned to the neutral position, i.e., an unoperated state, the timing T3 or T3a when the display unit 72 finishes displaying a captured image can be reliably delayed later than the timing T4 or T4a when the notification unit 73 finishes notifying a traveling direction. In addition, by changing the operation amount of the operation member 40 or 59 when the operator returns the operation member 40 or 59 to the neutral position, the displaying of the captured image by the display unit 72 and the notifying of the traveling direction by the notification unit 73 can be intentionally decided to be continued or to be finished. By setting the thresholds F3 or F3a and F4 or F4a to be small, it is possible to keep the display unit 72 displaying a captured image for a long time and to keep the notification unit 73 notifying a traveling direction for a long time. Furthermore, by setting the thresholds F3 or F3a and F4 or F4a to be large, it is possible to keep the display unit 72 displaying a captured image for a shorter time or to keep the notification unit 73 notifying a traveling direction for a shorter time.

In the present embodiment, the third threshold F3 or F3a is smaller than the fourth threshold F4 or F4a. In this configuration, the timing T3 or T3a when the display unit 72 finishes displaying a captured image can be delayed from the timings T4 and T4a when the notification unit 73 finishes notifying a traveling direction when the operation members 40, 59 return to the neutral position in the returning operation or the like. Then, the display device 72 can finish displaying a captured image after the notification unit 73 finishes notifying a traveling direction. In addition, by making the operation amounts of the operation members 40 and 59 larger than the third thresholds F3 and F3a and equal to or smaller than the fourth thresholds F4 and F4a trough the returning operation by an operator, the notification unit 73 finishes notifying a traveling direction and the display unit 72 can continue to display a captured image. Furthermore, by setting the fourth thresholds F4 and F4a to be large, the notification unit 73 can finish notifying a traveling direction even when the operator does not perform a large returning operation.

In this embodiment, the controller 75 controls the display unit 72 to finish displaying the captured image when the third predetermined time K3 or more has passed in a state where the operation amounts of the operation members 40 and 59 are the third thresholds or less, and controls the notification unit 73 to finish notifying the traveling direction when the fourth predetermined time K4 or more has passed in a state where the operation amounts of the operation members 40 and 59 are the fourth thresholds or less. In this configuration, even when the third thresholds F3 and F3a and the fourth thresholds F4 and F4a are set to be the same, the timings T3 and T3a when the display unit 72 finishes displaying a captured image can be reliably delayed from the timings T4 and T4a when the notification unit 73 finishes notifying a traveling direction when the operation members 40 and 59 are operated in the returning operation. In addition, by changing the operation amounts and operation times of the operation members 40 and 59 when an operator returns the operation members 40 and 59 to the neutral position, the displaying of a captured image by the display unit 72 and the notifying of a traveling direction by the notification unit 73 can be intentionally continued or not stopped. In addition, by setting the predetermined times K3 and K4 to be short, it is possible to control the display unit 72 to finish displaying a captured image and the notification unit 73 to finish notifying a traveling direction without lengthening the time to hold the operation amount of the operation members 40 and 59 at the thresholds F3, F3a, F4, and F4a or more. Furthermore, by setting the predetermined times K3 and K4 to be long, the display unit 72a can display a captured image for a long time, and the notification unit 73 can notify a traveling direction for a long time.

In the present embodiment, the third predetermined time K3 is longer than the fourth predetermined time K4. In this configuration, the timings T3 and T3a when the display unit 72 finishes displaying a captured image can be delayed from the timings T4 and T4a when the notification unit 73 finishes notifying a traveling direction when the operation members 40 and 59 are operated in the returning operation. Then, only by operating the operation members 40 and 59 in the returning operation, the notification unit 73 can finish notifying a traveling direction of the working machine 1, and then the display unit 73 finishes displaying a captured image. In addition, after the operation member 40 or 59 returned by the operator to the unoperated state is kept at the operation amount not more than any of the threshold F3, F3a, F4, and F4a for the third predetermined time K3 or longer but shorter than the fourth predetermined time K4, it is possible to perform only the displaying of a captured image by the display unit 72 without performing the notifying of the traveling direction by the notification unit 73. By setting the third fixed time K3 to be long, the display unit 72 can continue to display a captured image for a long time.

In the present embodiment, based on the operational state of the operation member 40 or 59, the controller 75 controls the display unit 72 to display an image of surroundings of the machine body 2 in the traveling direction of the traveling device 4, the image being captured by the camera device 70, and controls the notification unit 73 to notify the traveling direction of the traveling device 4. In this configuration, when the operation member 40 or 59 is operated for backward traveling, the display unit 72 displays the captured image of surroundings existing in the traveling direction of the working machine 1, and the notification device 73 notifies the traveling direction of the working machine 1. As the result, it is possible to improve convenience by effectively displaying the captured image and notifying the traveling direction.

In this embodiment, when the operation member 40 or 59 is moved in a direction corresponding to the backward traveling of the machine body 2, the controller 75 controls the display unit 72 to display an image of surroundings behind the machine body 2, the image being captured by the camera device 70, and controls the notification unit 73 to notify the backward traveling of the traveling device 4. In this configuration, when an operator, who is seated in the driver seat 13 and facing forward of the working machine 1, operates the operation member 40 or 59 in the backward-traveling operation, the display unit 72 displays the captured image of the surroundings behind the working machine 1, and the notification unit 73 notifies a backward traveling of the working machine 1. Accordingly, even when an operator does not turn around, the operator can see a captured image of an area behind the working machine 1 on the display unit 72 and know a backward condition. In addition, by setting the first threshold F1 or F1a to be small, even when the backward-traveling operation amount of the operation member 40 or 59 is not increased, the display unit 72 can display the captured image of surroundings backward of the working machine 1 before the working machine 1 starts to travel backward, so that the operator can check the image.

In the present embodiment, the traveling device 4 is hydraulically driven by receiving an operation fluid supply to travel in either one direction or the other direction. The working machine 1 includes the first operation valve 36 or 38 (the forward traveling operation valve 36 or the right-ward-traveling operation valve 38) to supply the operation fluid based on an operational state of the operation member 40 to operate the traveling device 4 so as to travel in the one direction, the second operation valve 37 or 39 (the back-ward-traveling operation valve 37 or the leftward-traveling operation valve 39) to supply the operation fluid based on the operational state of the operation member 40 to operate the traveling device so as to travel in the other direction, the first fluid lines 46 (46*a* and 46*b*) and 46*c*, or 46 (46*a* and 46*b*) and 48 to deliver the operation fluid from the first operation valve 36 or 38 to the traveling device 4, the second fluid lines 47 (47*a* and 47*b*) and 47*c*, or 47 (47*a* and 47*b*) and 49 to deliver the operation fluid from the second operation valve 37 or 39 to the traveling device 4, the first detector 81 or 83 (the pressure detector 81 or 83) to detect a first pressure of the operation fluid applied to the first fluid line 46*c* or 48, and the second detector 82 or 84 (the pressure detector 82 or 84) to detect a second pressure of the operation fluid applied to the second fluid line 47*c* or 49. Based on at least one of the first pressure and the second pressure, the controller 75 detects the operational state of the operation member 40 and judges the traveling direction of the traveling device 4.

The above configuration allows the controller 75 to reliably detect the presence or absence, operational direction, and operation amount of the operation member 40, and to properly control the display unit 72 to start and finish displaying the captured image and the notification unit 73 to start and finish notifying the traveling direction, based on the detection results.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
a machine body;
a traveling device provided with the machine body;
an operation member operable to activate the traveling device;
a camera device to capture an image of surroundings of the machine body;
a display unit to display the image captured by the camera device;
a notification unit to notify a traveling direction of the traveling device to at least one of an operator seated in a driver seat provided at the machine body and a person around the working machine; and
a controller to control the display unit and the notification unit so that when the operation member is operated to activate the traveling device, the display unit is controlled to display the captured image and the notification unit is controlled to notify the traveling direction, wherein
the controller defines a first start timing when the display unit starts to display the captured image and a second start timing when the notification unit starts to notify the traveling direction such that either one of the first start timing and the second start timing is delayed from the other one of the first start timing and the second start timing, wherein
the traveling device is hydraulically driven by receiving an operation fluid supply to travel in either one direction or the other direction,
the working machine comprising:
a first operation valve to supply the operation fluid based on an operational state of the operation member to operate the traveling device so as to travel in the one direction;
a second operation valve to supply the operation fluid based on the operational state of the operation member to operate the traveling device so as to travel in the other direction;
a first fluid line to deliver the operation fluid from the first operation valve to the traveling device;
a second fluid line to deliver the operation fluid from the second operation valve to the traveling device;
a first detector to detect a first pressure of the operation fluid applied to the first fluid line; and
a second detector to detect a second pressure of the operation fluid applied to the second fluid line, and
based on at least one of the first pressure and the second pressure, the controller detects the operational state of the operation member and judges the traveling direction of the traveling device.

2. The working machine according to claim 1, wherein the second start timing is delayed from the first start timing.

3. The working machine according to claim 1, wherein the controller controls the display unit to start to display the captured image when the operation amount of the operation member becomes a first threshold or more, and
the controller controls the notification unit to start to notify the traveling direction when the operation amount of the operation member becomes a second threshold or more, the second threshold being different from the first threshold.

4. The working machine according to claim 3, wherein the first threshold is smaller than the second threshold.

5. The working machine according to claim 1, wherein the controller controls the display unit to start to display the captured image after the operation amount of the operation member which is not less than a first threshold is kept for a first predetermined time or longer, and
the controller controls the notification unit to start to notify the traveling direction after the operation amount of the operation member which is not less than a second threshold is kept for a second predetermined time or longer, the first predetermined time being different from the second predetermined time.

6. The working machine according to claim 5, wherein the first predetermined time is shorter than the second predetermined time.

7. The working machine according to claim 1, wherein the controller controls the display unit to finish displaying the captured image and the notification unit notifying the traveling direction in accordance with at least either one of a reduced operation amount or a reduced operation time of the operation member, while the operation member is operated back towards a neutral position, and
the controller defines a first end timing when the display unit finishes to display the captured image and a second end timing when the notification unit finishes to notify the traveling direction such that either one of the first end timing and the second end timing is delayed from the other one of the first end timing and the second end timing.

8. The working machine according to claim 7, wherein the controller controls the display unit to finish displaying the captured image when the operation amount of the operation member becomes a third threshold or less, and
the controller controls the notification unit to finish notifying the traveling direction when the operation amount of the operation member becomes a fourth threshold or less, the fourth threshold being different from the third threshold.

9. The working machine according to claim 8, wherein the third threshold is smaller than the fourth threshold.

10. The working machine according to claim 7, wherein the controller controls the display unit to finish displaying the captured image after the operation amount of the operation member not more than the third threshold is kept for a third predetermined time or longer, and
the controller controls the notification unit to finish notifying the traveling direction after the operation amount of the operation member not more than the fourth threshold is kept for a fourth predetermined time or longer, the fourth predetermined time being different from the third predetermined time.

11. The working machine according to claim 10, wherein the third predetermined time is longer than the fourth predetermined time.

12. The working machine according to claim 1, wherein when the operation member is operated at a predetermined operation amount or more, the controller controls the display unit to display the image of surroundings of the machine body in the traveling direction of the traveling device which corresponds to the operation direction of the operation member, the image being captured by the camera device, and controls the notification unit to notify the traveling direction of the traveling device.

13. The working machine according to claim 12, wherein when the operation member is operated at a predetermined operation amount or more in a direction corresponding to backward traveling of the machine body, the controller controls the display unit to display an image of surroundings behind the machine body, and controls the notification unit to notify the backward traveling of the machine body.

14. A working machine comprising:
a machine body;
a traveling device provided with the machine body;
an operation member operable to activate the traveling device;
a camera device to capture an image of surroundings of the machine body;
a display unit to display the image captured by the camera device;
a notification unit to notify a traveling direction of the traveling device to at least one of an operator seated in a driver seat provided at the machine body and a person around the working machine; and
a controller to control the display unit to display the captured image and to control the notification unit to notify the traveling direction, when the operation member is operated from a neutral position to activate the traveling device, wherein
the controller controls the display unit to finish displaying the captured image and the notification unit notifying the traveling direction, while the operation member is operated back towards the neutral position,
the controller defines a first end timing when the display unit finishes to display the captured image and a second end timing when the notification unit finishes to notify the traveling direction such that either one of the first end timing and the second end timing is delayed from the other one of the first end timing and the second end timing,
the traveling device is hydraulically driven by receiving an operation fluid supply to travel in either one direction or the other direction,
the working machine comprising:
a first operation valve to supply the operation fluid based on an operational state of the operation member to operate the traveling device so as to travel in the one direction;
a second operation valve to supply the operation fluid based on the operational state of the operation member to operate the traveling device so as to travel in the other direction;
a first fluid line to deliver the operation fluid from the first operation valve to the traveling device;
a second fluid line to deliver the operation fluid from the second operation valve to the traveling device;
a first detector to detect a first pressure of the operation fluid applied to the first fluid line; and
a second detector to detect a second pressure of the operation fluid applied to the second fluid line, and
based on at least one of the first pressure and the second pressure, the controller detects the operational state of the operation member and judges the traveling direction of the traveling device.

15. The working machine according to claim 14, wherein the first end timing is delayed from the second end timing.

16. The working machine according to claim 14, wherein the controller controls the display unit to finish displaying the captured image when the operation amount of the operation member becomes a third threshold or less, and
the controller controls the notification unit to finish notifying the traveling direction when the operation amount of the operation member becomes a fourth threshold or less, the fourth threshold being different from the third threshold.

17. The working machine according to claim 14, wherein the controller controls the display unit to finish displaying the captured image after the operation amount of the operation member not more than the third threshold is kept for a third predetermined time or longer, and
the controller controls the notification unit to finish notifying the traveling direction after the operation amount of the operation member not more than the fourth threshold is kept for a fourth predetermined time or longer, the fourth predetermined time being different from the third predetermined time.

18. The working machine according to claim 14, wherein when the operation member is operated in a direction corresponding to backward traveling of the machine body, the controller controls the display unit to display an image of surroundings behind the machine body, the image being captured by the camera device, and controls the notification unit to notify the backward traveling of the machine body.

* * * * *